United States Patent
Parikh et al.

(10) Patent No.: US 12,475,467 B1
(45) Date of Patent: Nov. 18, 2025

(54) CHARACTER RECOGNITION SYSTEMS AND METHODS

(71) Applicant: Block, Inc., Oakland, CA (US)

(72) Inventors: Tanuj Parikh, Santa Monica, CA (US); Christopher Handel, Mill Valley, CA (US); Robert Seward, Brooklyn, NY (US)

(73) Assignee: Block, Inc., Oakland, CA (US)

( * ) Notice: Subject to any disclaimer, the term of this patent is extended or adjusted under 35 U.S.C. 154(b) by 94 days.

(21) Appl. No.: 17/988,422

(22) Filed: Nov. 16, 2022

Related U.S. Application Data

(60) Provisional application No. 63/290,229, filed on Dec. 16, 2021.

(51) Int. Cl.
  *G06Q 20/40* (2012.01)
  *G06Q 20/32* (2012.01)
  *G06V 30/14* (2022.01)
  *G06V 30/19* (2022.01)

(52) U.S. Cl.
  CPC ..... *G06Q 20/4016* (2013.01); *G06Q 20/3278* (2013.01); *G06V 30/14* (2022.01); *G06V 30/19013* (2022.01)

(58) Field of Classification Search
  CPC .......... G06Q 20/4016; G06Q 20/3278; G06V 30/14; G06V 30/19013
  See application file for complete search history.

(56) References Cited

U.S. PATENT DOCUMENTS

| | | | |
|---|---|---|---|
| 7,970,213 B1 | 6/2011 | Ruzon et al. | |
| 8,805,125 B1 * | 8/2014 | Kumar | G06V 30/418 |
| | | | 382/321 |
| 9,147,275 B1 | 9/2015 | Hyde-Moyer et al. | |
| 9,324,070 B1 | 4/2016 | Bekmann et al. | |
| 9,483,760 B2 | 11/2016 | Bekmann et al. | |
| 10,019,641 B2 | 7/2018 | Bekmann et al. | |
| 10,380,559 B1 * | 8/2019 | Oakes, III | G06V 30/2253 |
| 10,848,665 B1 * | 11/2020 | Prasad | G06Q 20/3223 |
| 2005/0216564 A1 | 9/2005 | Myers et al. | |
| 2010/0194690 A1 | 8/2010 | Wilairat | |
| 2012/0143760 A1 * | 6/2012 | Abulafia | G06Q 20/10 |
| | | | 235/380 |
| 2012/0239542 A1 | 9/2012 | Preston et al. | |

(Continued)

FOREIGN PATENT DOCUMENTS

| | | | | |
|---|---|---|---|---|
| CN | 112597327 A * | 4/2021 | ......... | G06F 16/2433 |
| EP | 1530122 A2 | 5/2005 | | |

(Continued)

*Primary Examiner* — Peter D Nolan
*Assistant Examiner* — Matthew Cobb
(74) *Attorney, Agent, or Firm* — IP Spring

(57) ABSTRACT

Techniques described herein are directed to generation and use of a system that allows a payment service to read payment objects, onboard users, and detect fraud using data from the payment objects. The systems and methods may include receiving instructions to obtain images of a payment instrument and generating data representing those images, which may include a 3D model of the payment instrument. A comparison of the generated data and previously stored data may be performed and the results of this comparison may be utilized to determine a likelihood that a fraudulent event is occurring with respect to the payment instrument.

19 Claims, 15 Drawing Sheets

(56) References Cited

U.S. PATENT DOCUMENTS

| | | |
|---|---|---|
| 2012/0284185 A1 | 11/2012 | Mettler et al. |
| 2013/0085908 A1 | 4/2013 | Singh et al. |
| 2014/0078559 A1 | 3/2014 | Wu |
| 2014/0126825 A1 | 5/2014 | Luo |
| 2014/0143143 A1 | 5/2014 | Fasoli et al. |
| 2014/0267072 A1 | 9/2014 | Andersson et al. |
| 2014/0270329 A1 | 9/2014 | Rowley et al. |
| 2014/0279516 A1 | 9/2014 | Rellas et al. |
| 2015/0046276 A1 | 2/2015 | Artman et al. |
| 2015/0126825 A1 | 5/2015 | Leboeuf et al. |
| 2015/0370779 A1 | 12/2015 | Dixon et al. |
| 2015/0379502 A1 | 12/2015 | Sharma et al. |
| 2016/0019439 A1 | 1/2016 | Wang et al. |
| 2016/0125387 A1 | 5/2016 | Bekmann et al. |
| 2016/0162676 A1* | 6/2016 | Myers .................. G06F 21/32 726/9 |
| 2023/0120865 A1* | 4/2023 | Nascimento ......... G06V 30/418 705/44 |

FOREIGN PATENT DOCUMENTS

| | | |
|---|---|---|
| EP | 3213277 A1 | 9/2017 |
| WO | 2016/073359 A1 | 5/2016 |

\* cited by examiner

CHARACTER RECOGNITION SYSTEMS AND METHODS

PRIORITY

This patent application claims priority to U.S. Provisional Patent Application No. 63/290,229 filed Dec. 16, 2021 and entitled "CHARACTER RECOGNITION SYSTEMS AND METHODS," which is fully incorporated by reference herein in its entirety.

TECHNICAL FIELD

When consumers make online purchases or purchases using mobile devices, they are often forced to enter credit card information into the mobile device for payment. Due to the small screen size and keyboard interface on a mobile device, such entry is generally cumbersome and prone to errors. Users may use many different cards for purchases, such as credit cards, debit cards, stored value cards, and other cards. Information entry difficulties are multiplied for a merchant attempting to process mobile payments on mobile devices for multiple transactions.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
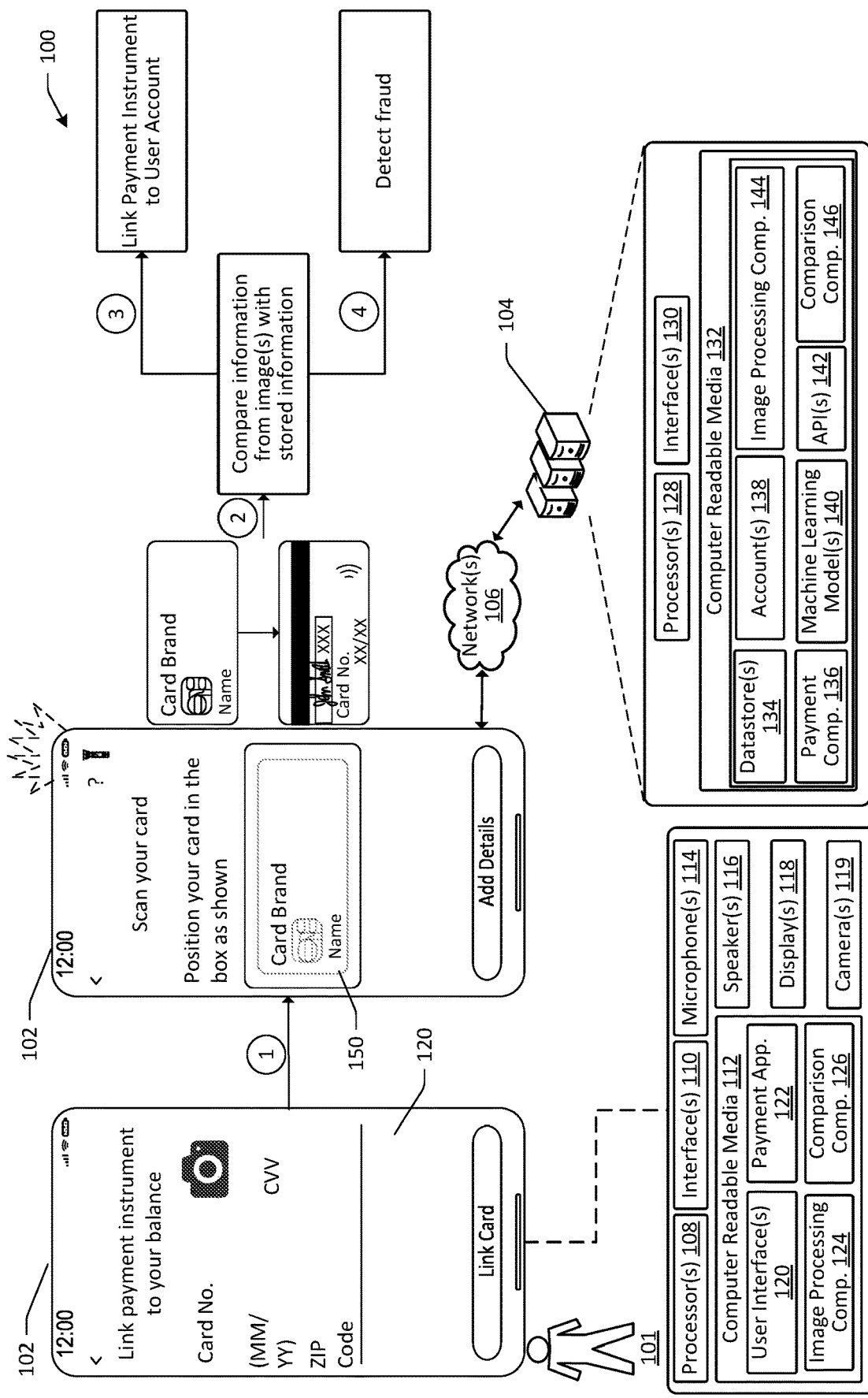
FIG. 1 is an example of environment for character recognition systems and methods, according to an embodiment described herein.

Disclosed herein are techniques ("recognition technology") for allowing a user device to extract information, e.g., payment instrument information, using recognition techniques (e.g., optical character recognition ("OCR"), image recognition, computer vision, voice recognition, or a combination thereof), and for using the extracted information for many purposes, including to link a payment instrument to a user account, to verify a transaction, and/or to prevent fraud. In examples, the process of extracting payment instrument information may be improved by scanning (e.g., via a camera, image capturing device, sensor, or the like) an object, e.g., payment card, a near-field communication (NFC) chip, a Quick Response (QR) code or the like, using various observation angles, orientations, etc. and then comparing the scanned images against multiple reference images to determine if the information extracted from the multiple images corresponds at least to a threshold degree to the reference images and/or other representations of the payment instrument in question. By so doing, techniques described herein may improve the security of digitally generated and stored financial information and reduce the likelihood of fraud in a manner that minimizes or outright eliminates user error and nefarious actors associated with more typical payment instrument input.

For example, payment instrument linking to a given user account may occur at a number of times while a payment application is being utilized. Some example entry points may include during an onboarding process where the payment application is setup for the user in question, while the user account at issue is created, when funds are requested to be added to a stored balance account associated with the user account, when funds are withdrawn from a stored balance account, and/or when a transactions is performed, for example, when payment is made to a merchant. In these and other examples, user input data may be received requesting to link and/or utilize a given payment instrument. In examples, the payment application may cause a user interface to be displayed requesting a user of the user device to position the payment instrument in a certain manner such that one or more images of the payment instrument may be captured depicting the payment instrument in a determined perspective. As used herein, the "user device" may also be referred to as a "device" or the like, and the "payment instrument" may be referred to as a "payment object," an "object," a "card," and the like. The payment application, in some examples, may cause a camera of the user device to enable and/or for a camera application installed on the user device to enable in order to acquire the images described herein. When the payment application detects that the payment instrument has been placed within a field of view of the camera as instructed and the given perspective of the payment instrument is being viewed, the payment application may cause the camera of the user device to automatically (or otherwise without requiring user input) to capture one or more images and to generate corresponding image data. This process may be repeated, in examples, one or more times where different perspectives of the payment instrument are to be acquired. In examples, a risk metric may be generated for the user account at issue and that risk metric may be utilized to determine the number of payment instrument perspectives to be acquired and/or which perspectives are to be acquired. As used herein, the "risk metric" may be referred to as a "risk value" or the like. Additionally, the "payment instrument perspectives" may be referred to as "perspectives," "orientations," "angles," and the like.

Once image data corresponding to the different perspectives of the payment instrument is generated, in examples, the image data may be utilized to generate a three-dimensional (3D) model of the payment instrument. Such generated image data and/or 3D models can be referred to as "obtained data," "generated data," "detected data," "scanned data," or the like. The 3D model may be data that meshes the various images together such that a complete or near complete digital representation of the payment instrument is generated. The 3D model, in addition to depicting information found on the payment instrument (e.g., a card identifier), may also indicate other physical attributes of the payment instrument such as thickness, curvature, embossing, etc. The image data and/or the 3D model of the payment instrument may then be analyzed in one or more ways to extract information about the payment instrument. Example analysis techniques include OCR processing where the data is analyzed to first determine portions of the data that correspond to text and then to recognize the textual characters in those portions of the data. Additional analysis techniques include computer vision processing where objects depicted on the payment instrument are identified and/or where attributes of the payment instrument itself are determined (e.g., thickness, embossing, etc.). As used herein, the "attributes" may be referred to as "characteristics," "card characteristics," "payment instrument characteristics," and the like.

Once this payment card information is extracted from the image data and/or 3D model as described herein, the payment instrument information may be compared to stored data known about the user account at issue and/or known about the payment instrument. Such stored data can also be referred to as "reference data," "stored data," or the like. In some examples, the recognition system described herein may not have previously received data about the payment instrument in question but information about the user account may have been previously known. Such user account information may include, for example, a user name, a payment instrument issuer that the user is associated with, an image of the user, an indication that the user is associated with a payment instrument that includes an NFC chip (or not), user address and/or other contact information, etc. In examples where the recognition system has previously received data associated with the payment instrument in question, that data may include any or all of the user account data mentioned above as well as card identifiers, card expiration dates, the user's name as it appears on the payment instrument, an indication of whether the payment instrument is a personal card or a business card, NFC chip images, NFC chip signals and/or other information acquired from the NFC chip of the payment instrument, a card security code (CVV), etc. This stored reference data known about the user account and/or the payment instrument may be compared to the payment instrument information acquired from the image data and/or the 3D model to determine similarities and differences therebetween. Similarity thresholds, which may be dynamic, may be established for determining when the acquired information from the payment instrument sufficiently matches the stored information such that one or more actions can be taken by the recognition system and/or the payment application.

For example, when the acquired payment instrument information and the stored payment instrument information have sufficient similarities (e.g., similarities satisfy a threshold), the payment application and/or the recognition system may perform processes to link the payment instrument to the user account in question. Such a linkage may thereafter allow a user of the payment application to utilize the payment instrument for making payments on transactions and/or for making peer-to-peer payments, for example. Other actions may include verifying that the payment instrument may be utilized for a given transaction that the user has engaged in, determining that use of the payment instrument is or is not fraudulent, and so on. In some examples, the acquired payment instrument information does not have sufficient similarities to the stored information, that is, differences between the acquired payment instrument information and the stored payment instrument information satisfy a threshold (or, do not satisfy a similarity threshold), fraudulent activity can be detected. When fraudulent activity is detected, actions such as declining the transaction at issue, refusing to link the payment instrument to the user account, suspending the user account, etc. may be performed. Further, in some examples, when fraudulent activity is detected, the user may be prompted to complete additional or alternative actions to prove or attempt to prove that the activity is not fraudulent.

Utilizing the systems and methods described herein, the computer-centric problem of how to verify payment instrument information on a user device with a screen of limited size and with a digital keyboard is solved. For example, user device screens are generally very small when compared to other types of screens found on, for example, televisions. The limited area afforded by such a user device screen makes it impracticable for all of the information associated with a payment instrument to be requested and entered at the same time. Additionally, the use of digital keyboards further complicates the process of acquiring payment instrument information by limiting such input to text and/or by requiring users to open, copy, and paste information from other applications into the payment application at issue. Because of these computer-centric problems, current technologies request basic user input associated with a payment instrument, leaving out a great deal of potential information that could be acquired and compared with known data to determine if the payment instrument in question should be verified for use as described herein. To solve this computer-centric problem, the present systems and methods disclose the ability to automatically enable a camera on a user device and a camera-related application to capture multiple images of a payment instrument. Then computer-centric solutions of utilizing OCR and/or computer vision technology are employed to generate 3D models and to extract information from the payment instrument in question. Doing so eliminates the digital keyboard issue entirely and removes the screen size issue by not requiring the user to input payment instrument information. By so doing, the computer-centric problem noted above is solved and even intricate details (e.g., details that may not be perceptible to a human) on the payment instrument may be utilized for verification purposes.

Additionally, the systems and methods described herein may also be utilized to solve the computer-centric problem of requiring image capture of a specific perspective of a payment instrument in order to initiate analysis of the same. For example, typical image-based software requires the user to capture an image of an object in a very specific perspective and if the user fails to do so the image is not processed and/or may be processed incorrectly. This computer-centric limitation to image analysis is solved utilizing the 3D model generation described herein. For example, a scan of the payment instrument in question may be performed over a period of time and images corresponding to that scan can be parsed and selected for the perspectives that may be used for image-based analysis. Additionally, by using a 3D model and then extracting information from that 3D model, image comparison need not be performed but instead a comparison of the extracted information to previously stored information can be performed. By so doing, a previous image of the payment instrument may not be needed and the previous image (if acquired) may not need to be from the exact same perspective as the image of the payment instrument in question.

In addition to the above, the systems and methods described herein may also be utilized to solve the computer-centric problem of fraudulent actors intercepting transaction communications sent in a computing network and utilizing those transaction communications for nefarious means. For example, a nefarious actor may intercept a transaction communication where a personal account number of a payment instrument is included in the communication. The nefarious actor may then utilize that personal account number to enter into subsequent transactions as if authorized to do so. However, utilizing the systems and methods described herein, even if such transaction communications are intercepted, without the payment instrument being linked to the user device involved in the transaction the system described herein would not authorize the transaction. Such a linkage between payment instrument and user device and/or user account occurs when the image data and/or 3D model generated as described herein corresponds to stored data to a sufficient degree to establish the linkage. As such, fraudulent activity on a computing network is minimized and security of the network in question increases.

Furthermore, the generation of accurate digital representations of payment instruments is a problem that is grounded solely in computing systems. But, as outlined above, simply taking a picture of a payment instrument may not be enough to accurately generate such a digital representation. To solve this problem, the described 3D models of the payment instruments may be generated and utilized to extract accurate and granular information from a payment instrument. Doing so through the use of specifically trained machine learning models may further improve the accuracy of the generated 3D models as well as the accuracy of the information obtained from the 3D models by learning attributes of payment instruments that may be distinctive and thus capable of comparison with stored data.

Lastly, as noted above, instead of requiring the use of multiple user interfaces to acquire manually-entered payment instrument information, the systems and methods herein may utilize a single interface for scanning the payment instrument and then authorizing the payment instrument to be linked to the user account in question or otherwise to be used in a transaction. This decrease in the number of user interfaces needed and elimination of the need to provide functionality for manual entry of payment instrument information results in a payment application that is more streamlined and thus requires less application storage on the user device in question than if more typical information determination methodologies were used. This decreased application storage allows for less memory on the user device to be used and thus for the user device to function more quickly and to allow the user device to utilize memory for other purposes (e.g., for other applications).

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment 100 for character recognition systems, according to an embodiment described herein. The environment 100 of FIG. 1 may include a user 101 associated with a user device 102 and a payment service 104, which can communicate via network(s) 106. A user 101 can be any user of a payment application 122 as described herein. Each of the devices can comprise one or more computing devices. Additional details associated with the user devices 102, the payment service 104, and the network(s) 106 are described below with reference to FIGS. 10-14.

The user devices 102 may include one or more components such as one or more processors 108, one or more network interfaces 110, computer-readable media (CRM) 112, one or more microphones 114, one or more speakers 116, one or more displays 118, and/or one or more cameras 119. The microphones 114 may be configured to receive audio input from the environment 100 and to generate corresponding audio data, which may be utilized as discussed herein. The speakers 116 may be configured to output audio, such as audio associated with a given transaction. The displays 118 may be configured to present graphical user interfaces. In some examples, the displays 118 can output images, videos, or the like via such graphical user interfaces. The cameras 119 may be configured to capture images within a field of view of the cameras 119 and to generate image data corresponding to the captured images.

The CRM 112 may include one or more applications or other components. For example, the one or more applications or other components can include one or more user interface(s) 120, a payment application 122, an image processing component 124, and/or a comparison component 126. A user interface 120 can be included in the payment application 122 as an interstitial, widget, or pop-up display. The CRM 112 can include additional or alternative applications such as a content creation and/or streaming application, a messaging application, an email application, a forum application, a photo application, a calendar application, a ticketing application, a social networking application, or the like. In some examples, the applications can be provided by a same service provider (e.g., the payment service) or different service providers, such as the payment service and one or more third-party service providers.

The applications or other components may be configured to execute in the foreground and background of the user device 102. For example, the payment application 122 may be configured to execute in the foreground when a user is actively engaged in one or more of the functionalities of the payment application 122. In other examples, the payment application 122 may be configured to execute in the background when a user is not actively engaged in one or more of the functionalities, but the payment application 122 is still "open" and is capable of communicating with other applications on the user device 102 and/or with payment service 104 associated with the payment application 122. It should be understood that the user interfaces 120 described herein may include the payment application 122 and may include one or more other user interfaces as described herein. It should also be understood that the payment application 122 or the functionality associated therewith can be integrated into other applications, such as third-party applications.

The payment service 104, which can be associated with one or more computing devices, such as server computing devices, may include components such as one or more processors 128, one or more network interfaces 130, and/or CRM 132. The CRM 132 may include one or more components such as, for example, datastore(s) 134, one or more accounts 138, a payment component 136, one or more machine learning models 140, one or more application programming interfaces (APIs) 142, an image processing component 144, and/or a comparison component 146. These components will be described below by way of example. The CRM 132 can include additional or alternative components and, in some examples, one or more components can be combined.

In at least one example, the payment service 104 can expose functionality and/or services via the one or more APIs 142, thereby enabling functionality and/or services described herein to be integrated into various functional components of the environment 100. The API(s) 142, which can be associated with the payment service 104, can expose functionality described herein and/or avail payment services to various functional components associated with the environment 100. At least one of the API(s) 142 can be a private API, thereby availing services and/or functionalities to functional components (e.g., applications, etc.) that are developed internally (e.g., by developers associated with the payment service). At least one of the API(s) 142 can be an open or public API, which is a publicly available API that provides third-party developers (e.g., merchant platforms described herein) with programmatic access to a proprietary software application or web service of the payment service. That is, the open or public API(s) can enable functionality and/or services of the payment service to be integrated into one or more applications. The API(s) 142 can include sets of options that govern how applications, or other functional components, can interact with one another.

In some examples, the payment service 104 can provide third-party entities with a software developer kit ("SDK") that may utilize functionality exposed by the API(s) 142. The SDK can include software development tools that allow a third-party developer (i.e., a developer that is separate from the payment service) to include functionality and/or avail services as descried herein. The SDK and/or the API(s) 142 may include one or more libraries, programming code, executables, other utilities, and documentation that allows a developer to directly include functionality and/or avail services described herein within an application.

The datastore(s) 134 can store, among other types of data, user profiles. For instance, a user profile of the user can store payment data associated with payment instrument(s) or user account(s) of a user. In some examples, an account maintained by the payment service 104 on behalf of the user can be mapped to, or otherwise associated with, the user profile. Such an account can be associated with a stored balance maintained by the payment service 104. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile, which can be associated with different assets, such as stocks, cryptocurrency, non-fungible tokens, or the like. In some examples, a user profile can include historical group data, geographic data, customer preferences, subject matter preferences, transaction data, contacts data, social relationship data, user preferences, metadata tag data, and other information associated with participation in the transactions described herein. Additional details associated with data that can be stored in association with user profiles are provided below. The stored data indicating known attributes of payment instruments and/or user accounts may be stored in the datastore 134.

Utilizing the components of the user device 102 and/or the payment service 104 as described above, attributes of payment instruments may be acquired and/or generated and compared to known reference attributes to determine whether to allow the payment instrument to be utilized in a requested way, such as for linking the payment instrument to a user account utilizing the payment instrument in a transaction, determining if the payment instrument is being used for a fraudulent purpose, etc. To do so, user input data may be received at the user device 102 requesting to link and/or utilize a given payment instrument. In examples, such as at step 1 shown in FIG. 1, the payment application 122 may cause a user interface 120 to be displayed requesting a user of the user device 102 to link the payment instrument to the user account 138. In some examples, the user interface 120 may provide the option to manually input at least a portion of the payment instrument information. In other examples, such an option may not be provided but instead the user interface 120 may automatically transition to displaying an instruction to move or otherwise position the payment instrument in a certain manner such that one or more images of the payment instrument may be captured depicting the payment instrument in a determined perspective.

In examples, the instruction to scan the payment instrument in various perspectives may be based at least in part on a risk metric associated with the user account at issue. For example, the number of perspectives to be captured, as well as the types of perspectives themselves may be determined based at least in part on the risk metric. In a specific example, a risk metric indicating low risk of fraudulent activity may request that a single perspective of the payment instrument (e.g., the front of the payment instrument) be captured. In another example, a risk metric indicating high risk of fraudulent activity may request that a complete scan of all sides of the payment instrument be made such that a 3D model of the payment instrument can be generated. To determine the risk metric for a given user account, details associated with the user account may be utilized and input into a model, which may be a trained machine learning model 140. The details may be any details known to the payment service 104 about the user account, but by way of example could be the user's name, addresses, contact information, merchants that the user has transacted with, how long the user account has been active, whether the user account has been associated with fraudulent activity in the past, a number of services utilized by the user account, social network data associated with the user account, the type of transaction at issue, a number of other payment instruments that are linked to the user account, etc. The model may be configured to intake some or all of this information and to determine a risk metric for the user account. The risk metric may be in the form of a numerical value that is associated with a scale, such as a risk metric of 4 on a scale of 1 to 5 with 1 being low risk and 5 being high risk. It should be understood that the risk metric may take any form and the scale may also take any form.

In other examples, attributes of the payment instrument itself may be utilized to determine the perspectives to be obtained. For example, a type of the object (e.g., a credit card, a debit card, a loyalty card, a check, a gift card, a travel document, a check, an invoice, a driver's license, etc.) may be utilized to determine a risk metric associated with the object and thus how many and which types of perspectives to request. In a specific example, a credit card type of payment instrument may be associated with a greater risk metric and thus may be associated with acquisition of multiple perspectives of the payment instrument, while a gift card type of payment instrument may be associated with a lower risk metric and thus may be associated with acquisition of a single perspective and/or different perspectives of the payment instrument than other payment instrument types.

The payment application 122, in some examples, may cause a camera 119 of the user device 102 to enable and/or for a camera application installed on the user device 120 to enable in order to acquire the images described herein. The user interface 120 may display information to assist the user in acquiring images of the payment instrument for analysis purposes. For example, the instructions may request that the user position the payment instrument in a certain way and within a given portion of the field of view of the camera 119. A template 150 may also be displayed on the user interface 120 to provide the user with a visual instruction for what the payment instrument should look like when viewed by the camera 119. The template can further provide instructions for how to move or otherwise position the payment instrument within the view of the camera 119.

When the payment application detects that the payment instrument has been placed within a field of view of the camera as instructed and the given perspective of the payment instrument is being viewed, the payment application 122 may cause the camera 119 of the user device 102 to automatically (or otherwise without requiring user input) to capture one or more images and to generate corresponding image data. This process may be repeated, in examples, one or more times where different perspectives of the payment instrument are to be acquired. In some examples, instead of acquiring a single image of each perspective of the payment instrument, a scan of the payment instrument may be performed where multiple images are captured similar to a video of the payment instrument from the multiple perspectives.

Once image data corresponding to the different perspectives of the payment instrument is generated, in examples, the image data may be utilized by the image processing component 124 to generate a 3D model of the payment instrument. The 3D model may be data that meshes the various images together such that a complete or near complete digital representation of the payment instrument is generated. The 3D model, in addition to depicting information found on the payment instrument (e.g., a card identifier), may also indicate other physical attributes of the payment instrument such as thickness, curvature, embossing, holographic images, etc. For example, each image of the payment instrument that is captured may initially be analyzed to identify coordinates for each portion of the payment instrument. Doing so may allow the image processing component 124 to map identifying data of the payment instrument to the payment instrument itself and allows the image processing component 124 to identify a similar portion of the payment instrument as between multiple images such that the images may be meshed together to form the 3D model.

In addition to the 3D model generation described herein, which is focused on generating a digital representation of the surface of the payment instrument in question, additional data may be acquired from certain payment instruments. For example, some payment instruments may include a NFC chip embedded therein and the user device 102 may include a NFC reader device that may scan the payment instrument and acquire data from the NFC chip therein. Other examples of acquiring data from the payment instrument that is not necessarily image data may include doing so utilizing QR codes, RFIDs, etc. This information may be acquired and included in the 3D model.

The image data and/or the 3D model of the payment instrument may then be analyzed in one or more ways to extract information about the payment instrument. Example analysis techniques include OCR processing where the data is analyzed to first determine portions of the data that correspond to text and then to recognize the textual characters in that portion of the data. By way of example, a payment instrument may have on one or more of its surfaces various types of text. Those textual portions may include a card identifier, an expiration date, a bank or other institution associated with the payment instrument, a card issuer name, a classification of the payment instrument such as "platinum," "signature," "preferred," etc., the cardholder's name, a security code, website addresses, telephone numbers, a signature of the cardholder, membership numbers, membership dates, etc. Each of these textual portions of the payment instrument may be identified utilizing the OCR processing described herein and the text of each of these portions may be analyzed to identify the text itself. In other examples, the object in question may not be a payment instrument but may instead be another type of object such as a check, a travel document, a driver's license, etc. In these examples, the textual portions may include, for example, a check number, a routing number, a date, a payee name, a check amount, one or more bar codes, an endorsement portion, travel information, a driver's license number, an issuance date, indicators of organ donorship, an issuance state, a license classification, a date of birth, an address, information about physical features of the user such as eye color and hair color, a listing of endorsements, etc.

In the driver's license example, the process may be associated with identifying fake licenses and/or detecting fraud with respect to licenses. In this example, the driver's license itself may be scanned as described herein and the data acquired from the scan may be compared to stored data associated with the user depicted in the driver's license to determine similarities and differences. In another example, the driver's license itself may be the stored data and the user may be queried to take a picture of the user (e.g., a "selfie"). In this example, the attributes of the user's face from the picture may be compared to the stored data that is the driver's license to determine if the person at issue is the person depicted in the driver's license. In these and other examples, the ability to utilize and compare driver's license specific information may be based at least in part on state-specific requirements. For example, given states may require that drivers' licenses have a certain form, include certain information, have certain barcodes or other scannable features, etc. The presence or absence of these state-specific requirements from a scanned driver's license may be utilized to determine fraudulent activity or otherwise to verify (or not verify) the use of the driver's license for a given scenario.

Additional analysis techniques include computer vision processing where objects depicted on the payment instrument are identified and/or where characteristics of the payment instrument itself are determined (e.g., thickness, embossing, etc.). For example, the issuer of the payment instrument and/or one or more other entities associated with the payment instrument may place trademarks or other branding on the payment instrument. Other objects may include a NFC chip embedded in the payment instrument, designs and/or artwork placed on the payment instrument, a photograph of the cardholder, symbols associated with tap-to-pay functionality, a magnetic strip for swipe-to-pay functionality, one or more barcodes, one or more QR codes, etc. In addition to the objects depicted on the payment instrument, the characteristics of the payment instrument itself may include, for example, a thickness of the payment instrument, a card of the payment instrument, a size and/or shape of the payment instrument, a degree of embossing and/or concavity of text shown on the payment instrument, etc. The computer vision processing described herein may be utilized to identify some or all of these attributes of the payment instrument in question and to extract that information from image data of the payment instrument and/or from the 3D model of the payment instrument as generated.

In certain examples, some or all of the functions described are performed while the scan of the payment instrument is active. For example, the user 101 may hover the camera 119 of the user device 102 over the payment instrument and the methods described herein may be performed with live images of the payment instrument at various angles. That is, the payment application 122 captures and utilizes images from the active feed of the camera 119.

The recognition technology, the camera 119, the user device 102, and/or other computing devices may perform noise detection on the images. The image may be recognized as noisy, with other audio, other images in addition to the card, blurry, overly bright, overly dark, or otherwise obscured in a manner that prevents a high resolution image from being obtained. The recognition technology, or other function of the user device 102 or the camera 119, may adjust the capturing method to reduce the noise.

The recognition technology may isolate the boundaries or width of the card or otherwise may isolate the images. The recognition technology may crop the images to display the desired information from the card. In an example, if the card in the image is a credit card, the recognition technology may assess information associated with the expected location of the account number of the credit card. The expected location may be obtained from a database of card layouts stored on the user device 102 or in another suitable location such as the datastore 134. For example, credit cards, driver's licenses, loyalty cards, and other cards typically meet an industry standard for the data locations and the layout of the card. The industry standards may be stored and may be usable by the recognition technology described herein.

The recognition technology described herein may also categorize portions of image data and/or the 3D models into categories such as account numbers, user name, expiration date, card issuer, or other suitable data. The recognition technology may categorize these portions by comparing the formats of these portions to a database of formats. For example, if the results of the recognition technology on a portion of the payment instrument in question is "10/15", then the recognition technology may interpret the format as being associated with an expiration date.

Once this payment card information is extracted from the image data and/or 3D model as described herein by the image processing component 124, the comparison component 126, at step 2 as shown in FIG. 1, may be utilized to compare the extracted information to stored data known about the user account at issue and/or known about the payment instrument. In some examples, the comparison component 124 may not have previously received data about the payment instrument in question but information about the user account may have been previously known. Such user account information may include, for example, a user name, a payment instrument issuer that the user 101 is associated with, an image of the user 101, an indication that the user 101 is associated with payment instruments that include NFC chips or not, a user address and/or other contact information, etc. In examples where the comparison component 126 has previously received data associated with the payment instrument in question, that data may include any or all of the user account data mentioned above as well as any of the attributes of a payment instrument as described herein. This reference information may be stored in the datastore 134 and may be compared to the payment instrument information acquired from the image data and/or the 3D model to determine similarities and differences therebetween. For example, the comparison component 126 may determine whether the acquired card identifier, expiration date, and security code matches with stored data. By way of continued example, a comparison between a signature of the user 101 and a stored representation of the signature associated with the user account may also be performed. In this example, when information about the payment instrument has been previously acquired, the signature on the payment instrument may already be known to the comparison component 126 and thus an attempt at a one-to-one comparison that matches the acquired signature with a known reference signature may be performed. In other examples where a signature of the user 101 is stored in the datastore 134 but that signature is not necessarily associated with the payment instrument at issue (e.g., the reference signature is from another payment instrument), the comparison component 126 may attempt to determine similarities and differences between the acquired signature and the reference signature. Similarity thresholds, which may be dynamic, may be established for determining when the acquired information from the payment instrument sufficiently matches (e.g., satisfies a threshold) the stored information such that one or more actions can be taken by the payment service 104 and/or the payment application 122.

With respect to the similarity thresholds, some thresholds may be associated with an exact match. Examples of these exactly matching thresholds as between acquired payment instrument information and reference information may be associated with card identifiers, expiration dates, security codes, data received from NFC chips, QR codes, etc., and other information that should be determined with near certainty. Other thresholds for other attributes of the payment instrument may indicate less confidence is needed to determine if there is sufficient similarity. For example, artwork on the surface of the payment instrument, exact locations of objects on the surface of the payment instrument, similarity of objects on the payment instrument, etc. may be associated with less confident (e.g., lower) thresholds at least because there may be some variance between the 3D model generated as described herein and stored reference information about a payment instrument and/or because as a user 101 utilizes a payment instrument over time (e.g., by swiping, dipping, tapping, transferring the payment instrument in and out of a receptacle, accidentally washing/drying the payment instrument, etc.) the objects on the surface of the payment instrument may fade or become damaged. The thresholds described herein may account for such use over time and the thresholds may change over time.

The comparison component 126 may also set a threshold percentage of the results that are to match for the information to be accepted. For example, if 3 of the 4 results indicate that the user name is "John Smith," but a single result indicated that the user name was "Jahn Smith," then the recognition technology may determine that 3 out of 4 is sufficient to declare a match. Unless other evidence within the payment server (e.g., other payment transactions, delivery address, invoices, or other identity documents registered with the payment server) indicates that the name is Jahn Smith.

In examples where the comparison component 126 determines that sufficient similarities are identified as between the acquired payment instrument information and the stored reference payment instrument information, one or more actions may be taken. For example, when the acquired data and the stored data have sufficient similarities, the payment application 122 and/or the payment service 104 may perform processes, at step 3 as shown in FIG. 1, to link the payment instrument to the user account in question. Such a linkage may thereafter allow a user 101 of the payment application 122 to utilize the payment instrument for making payments on transactions and/or for making peer-to-peer payments, for example. Other actions may include verifying that the payment instrument may be utilized for a given transaction that the user 101 has engaged in, determining that use of the payment instrument is or is not fraudulent, such as at step 4 as shown in FIG. 1, and so on. When fraudulent activity is detected (e.g., when the acquired payment instrument information does not have sufficient similarities to the stored information), actions such as declining the transaction at issue, refusing to link the payment instrument to the user account, suspending the user account, etc. may be performed.

As shown in FIG. 1, the image processing operations and/or the comparison operations have been described above as being performed by the image processing component 124 and the comparison component 126 of the user device 102. However, such processes may be additionally or alternatively, in whole or in part, performed by an image processing component 144 and a comparison component 146 of the payment service 104. In these examples, the user device 102 may send the image data corresponding to the payment instrument to the payment service 104, which may analyze the image data, generate the 3D model, perform the comparison operations, and/or take the actions described above as being performed by the user device 102.

Also, one or more of the processes described above may be performed utilizing the machine learning models 140. For example, a machine learning model may be generated and configured to perform operations associated with determining the number and/or types of perspectives to instruct the user 101 to acquire of the payment instrument, determining the risk metrics described herein, determining whether to generate a 3D model of the payment instrument, determining how to generate the 3D model, identifying objects and/or text portions of the payment instrument, performing the comparison as between acquired payment instrument information and stored reference payment instrument information, determining the similarity thresholds described herein, detect fraudulent activity, etc. To do so, once the machine learning model(s) 140 are generated, output from the machine learning model(s) 140 may be acquired along with feedback data indicating performance of the machine learning model(s) 140. Some or all of this data may be formatted as a training dataset that may be utilized to generate trained machine learning model(s) 140 where various attributes of the model(s) 140 such as variables, confidences, and/or weightings utilized with respect to model inputs are changed based on the training dataset. These trained machine learning model(s) 140 may then be utilized to improve the outputs of the operations described herein, leading to more accurate comparison results and determinations on whether to allow linkage between payment instruments and accounts and/or on whether fraudulent activity is occurring.

It should be understood that any time user input is utilized to perform an operation as described herein, an intelligent operation or automatic operation may be performed instead such that user input is not required but instead a set of rules, the use of models, etc. is utilized to cause the operation at issue to be performed.

In some implementations, the methods and systems described herein can be integrated with voice services (e.g. Amazon's ALEXA®, Apple's SIRI®, or Microsoft's CORTANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein.

Throughout the specification, the general term "payment instrument" and/or "card" will be used to represent any type of object, such as a physical card instrument like an EMV card or NFC object, or more broadly anything that may have a signature embedded element, a QR code, an invoice, a check and the like. In example embodiments, the different types of cards represented by the term "card" can include credit cards, debit cards, stored value cards, loyalty cards, identification cards, or any other suitable card representing an account or other record of a user or other information thereon. Example embodiments described herein may be applied to the images of other items, such as receipts, boarding passes, tickets, and other suitable items. A "card" may also be an image or facsimile of the card. For example, the card may be a representation of a card on a display screen or a printed image of a card. The user may employ the card when making a transaction, such as a purchase, ticketed entry, loyalty check-in, or other suitable transaction. The user may obtain the card information for the purpose of importing the account represented by the card into a digital wallet application or for other digital account purposes. A user may desire to enter the information from the card into a user device 102 or other computing device, for example, to conduct an online purchase, to conduct a purchase at a merchant location, to add the information to a wallet application on a user device 102, or for any other suitable reason. In an example, the user 101 desires to use a user device 102 to conduct a purchase transaction using a digital wallet application executing on the user device 102. The digital wallet application may request an input of the details of a particular user payment account to conduct a transaction with the particular user payment account or to set up the account.

While techniques described herein relate to payment instruments, techniques can similarly be applicable to other types of instruments, such as identification cards, travel documents, tickets, checks, or the like.

Figure 2:
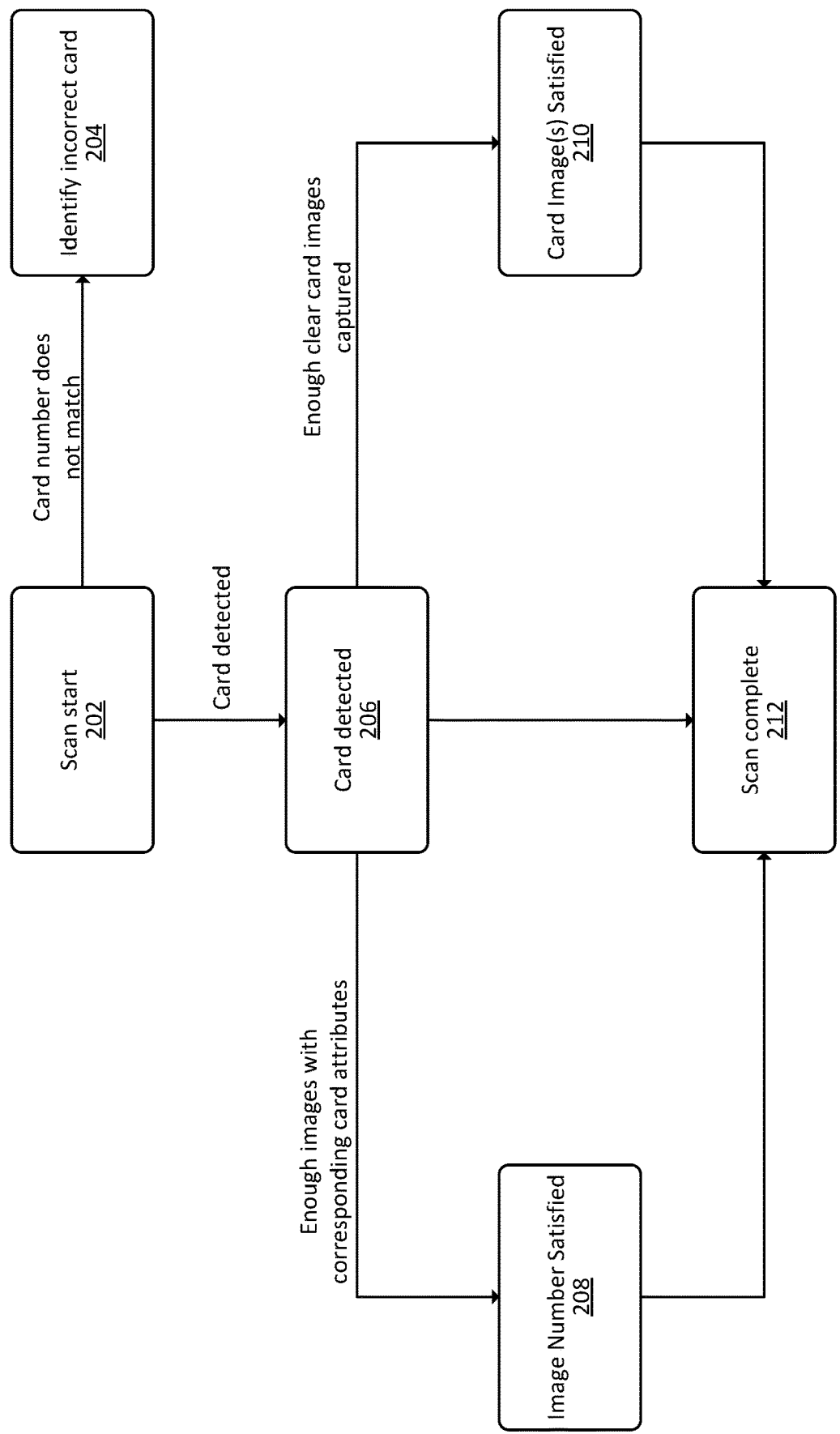
FIG. 2 is an example conceptual diagram of example processes performed by character recognition systems, according to an embodiment described herein.

FIG. 2 is an example conceptual diagram of example processes performed by character recognition systems, according to an embodiment described herein. As shown in FIG. 2, various processes may be performed for acquiring images of a payment instrument as described herein. To initiate this process, a trigger event such as a request to link the payment instrument to a user account, a request to utilize the payment instrument in a transaction, etc. may be detected. A user interface may be displayed as described in more detail with respect to FIG. 1 instructing a user to place the payment instrument within a field of view of a camera such that images of the payment instrument from one or more perspectives may be obtained.

At step 202, a scan of the payment instrument may be started. This scan may include the capture of various images of the payment instrument over time, such as in the form of a video. In indication that the scan has started may be presented on the user interface in question and directions for manipulating the payment instrument and/or the user device may be presented, in some cases dynamically, such that the payment instrument is positioned and/or repositioned for the purpose of acquiring a complete scan of the payment instrument and/or a complete scan of a given perspective of the payment instrument.

At step 204, initial analysis of the image data being generated on the fly may be utilized to determine a card identifier of the payment instrument being scanned. In certain examples where the scan of the payment instrument is being utilized to ensure that the payment instrument matches a payment instrument already on file and/or indicated to be linked to a user account, a comparison of the acquired card identifier to a reference card identifier may be performed. In examples where the acquired card identifier does not match the reference card identifier, a determination may be made that the incorrect payment instrument is being scanned by the user. The user interface may be adapted to display an indication that the incorrect payment instrument is being scanned, which may allow the user to remove the payment instrument from the field of view of the camera and to introduce a different payment instrument to be scanned.

At step 206, a determination may be made that a payment instrument is detected and the initial image processing indicates that the correct payment instrument (e.g., the payment instrument with the correct card identifier) is being scanned. At this point, a scan of the payment instrument may continue such that additional images of the payment instrument are captured and can be utilized for further image processing. It should be understood that while the card identifier of the payment instrument is used as the initial check to determine if the payment instrument in question is the correct payment instrument, other identifying information may additionally or alternatively be used, such as an expiration date, a security code, membership numbers, loyalty numbers, etc.

At step 208, a determination may be made as to whether the scan of the payment instrument has produced enough images with desired attributes. For example, one or more thresholds may be set for how many images of the payment instrument are to be acquired that depict certain attributes of the payment instrument. One such thresholds may be that 10 images depicting a card identifier are captured. Another such threshold may be that 5 images depicting an issuer logo are captured. Yet another such threshold may be that 7 images depicting a signature are captured. And so forth. If not enough images of the desired attributes are identified, the scan may continue until these thresholds are met. If enough of these images are identified, then a determination may be made that the threshold number of images to be utilized for further image processing and/or for generation of a 3D model of the payment instrument is satisfied.

At step 210, a determination may be made as to whether the scan of the payment instrument has produced enough images with a threshold level of clarity. For example, some images captured by the user device may be clear or otherwise may not be blurry. However, other images, such as images captured when the user device and/or the payment instrument were moving may have increased blurriness or otherwise lack clarity. The image analysis component as described herein may determine a degree of blurriness of the images that are captured and may determine how many of the images have a clarity that satisfies a given threshold. If such a threshold has not been satisfied, the scan of the payment instrument may continue. If such a threshold is satisfied, a determination may be made that the payment instrument images of sufficient clarity have been captured and can be utilized for further processing.

At step 212, once it is determined (1) that the payment instrument has been detected, (2) that a sufficient number of images have been captured with the desired attributes, and (3) that a sufficient number of those images have at least a threshold amount of clarity, a determination may be made that the scan of the payment instrument is complete. In this example, a determination may be made following steps 206, 208, and 210 that a scan time has been exceeded. For example, a scan time associated with scanning the payment instrument may be indicated as being exceeded to ensure that enough images have been captured for image analysis and/or 3D model generation.

Figure 3:
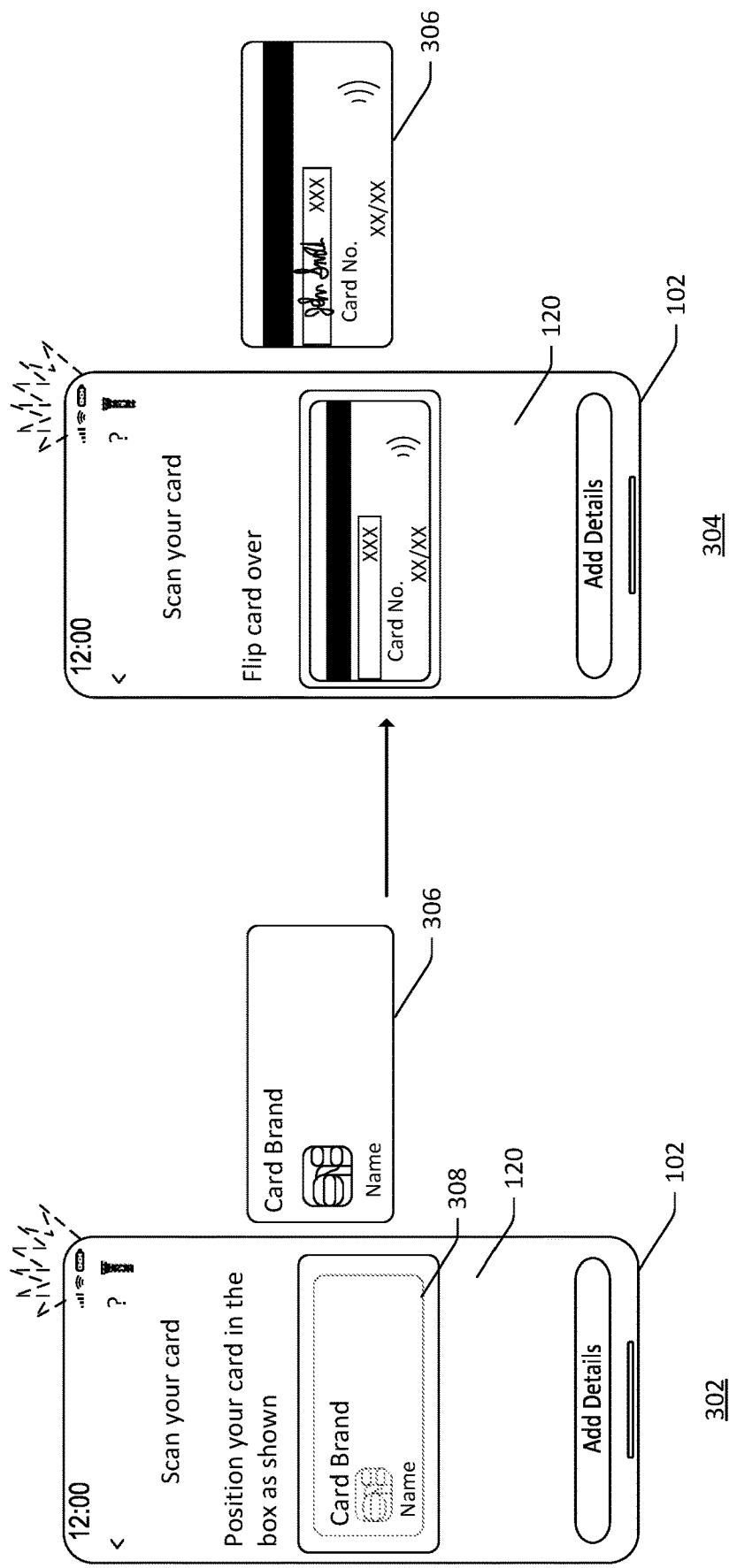
FIG. 3 is an example conceptual diagram showing a user device utilized to capture images of a payment instrument for character recognition purposes, according to an embodiment described herein.

FIG. 3 is an example conceptual diagram showing a user device utilized to capture images of a payment instrument for character recognition purposes, according to an embodiment described herein. The user device 102 may be the same or similar to the user device 102 described with respect to FIG. 1 and may perform the same or similar functions. Additionally, the payment instrument 306 shown in FIG. 3 may be the same or similar to any of the payment instruments described with respect to FIG. 1.

As shown at step 302 of FIG. 3, utilizing the components of the user device 102 and/or the payment service described with respect to FIG. 1, attributes of a payment instrument 306 may be acquired and/or generated. To do so, user input data may be received at the user device 102 requesting to link and/or utilize a given payment instrument 306. In examples, a payment application may cause a user interface 120 to be displayed requesting a user of the user device 102 to link the payment instrument 306 to a user account. In some examples, the user interface 120 may provide the option to manually input at least a portion of the payment instrument information. In other examples, such an option may not be provided but instead the user interface 120 may automatically transition to displaying an instruction to position the payment instrument 306 in a certain manner such that one or more images of the payment instrument 306 may be captured depicting the payment instrument 306 in a determined perspective.

As shown in step 302 of FIG. 1, the instruction is to first capture images of a front side of the payment instrument 306. The front side of the payment instrument 306 in this example may correspond to a first perspective of the payment instrument 306. A template 308 of the payment instrument 306 is displayed on the user interface 120 and may allow the user to attempt to match the payment instrument 306 as viewed through the field of view of the camera of the user device 102 with the template 308.

In examples, the instruction to scan the payment instrument 306 in various perspectives may be based at least in part on a risk metric associated with the user account at issue. For example, the number of perspectives to be captured, as well as the types of perspectives themselves may be determined based at least in part on the risk metric. In a specific example, a risk metric indicating low risk of fraudulent activity may request that a single perspective of the payment instrument 306 (e.g., the front of the payment instrument 306) be captured. In another example, a risk metric indicating high risk of fraudulent activity may request that a complete scan of all sides of the payment instrument 306 be made such that a 3D model of the payment instrument 306 can be generated. To determine the risk metric for a given user account, details associated with the user account may be utilized and input into a model, which may be a trained machine learning model. The details may be any details known to the payment service about the user account, but by way of example could be the user's name, addresses, contact information, merchants that the user has transacted with, how long the user account has been active, whether the user account has been associated with fraudulent activity in the past, a number of services utilized by the user account, social network data associated with the user account, the type of transaction at issue, a number of other payment instruments that are linked to the user account, etc. The model may be configured to intake some or all of this information and to determine a risk metric for the user account. The risk metric may be in the form of a numerical value that is associated with a scale, such as a risk metric of 4 on a scale of 1 to 5 with 1 being low risk and 5 being high risk. It should be understood that the risk metric may take any form and the scale may also take any form.

The payment application described herein, in some examples, may cause a camera of the user device 102 to enable and/or for a camera application installed on the user device 102 to enable in order to acquire the images described herein. When the payment application detects that the payment instrument 306 has been placed within a field of view of the camera as instructed and the given perspective of the payment instrument 306 is being viewed, the payment application may cause the camera of the user device 102 to automatically (or otherwise without requiring user input) to capture one or more images and to generate corresponding image data.

At step 304, this process may be repeated, in examples, one or more times where different perspectives of the payment instrument 306 are to be acquired. In some examples, instead of acquiring a single image of each perspective of the payment instrument 306, a scan of the payment instrument 306 may be performed where multiple images are captured similar to a video of the payment instrument 306 from the multiple perspectives. As shown in FIG. 3, the second perspective may be of a back side of the payment instrument 306, which may include attributes such as a cardholder signature, a magnetic strip, a card identifier (in some examples), an expiration date, and a tap-to-pay symbol.

Figure 4A:
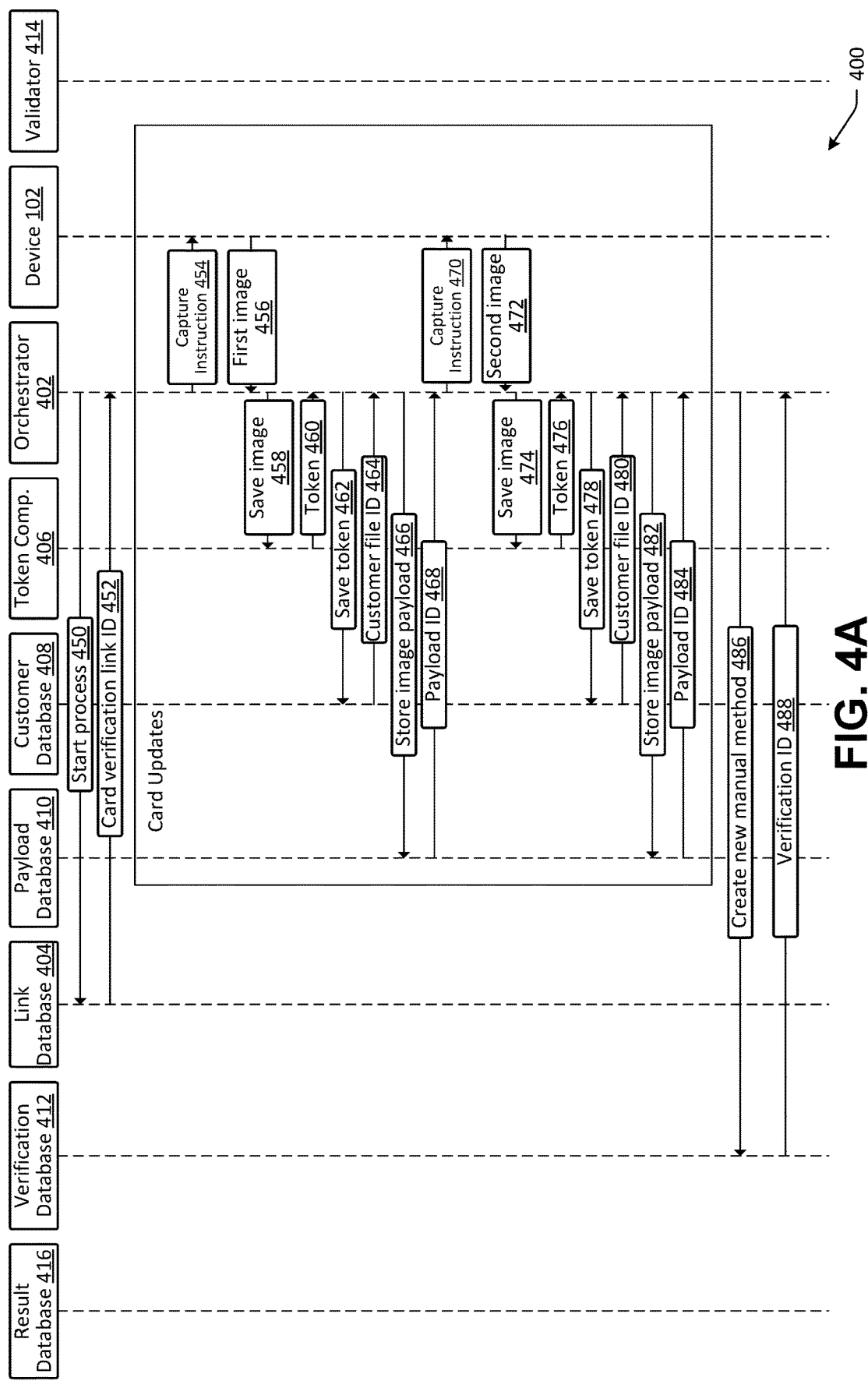
FIG. 4A is an example sequence diagram showing a process for verifying that a payment instrument is associated with a user account, according to an embodiment described herein.

FIG. 4A is an example sequence diagram showing a process 400 for verifying that a payment instrument is associated with a user account, according to an embodiment described herein. The order in which the operations or steps are described is not intended to be construed as a limitation, and any number of the described operations may be combined in any order and/or in parallel to implement process 400. The process 400 may be performed by various components as shown in FIG. 4A, including an orchestrator 402, a link database 404, a token component 406, a customer database 408, a payload database 410, a verification database 412, a validator 414, and/or a result database 416, as well as a user device 102 as described with respect to FIG. 1.

At step 450, the orchestrator 402 may send a start process command to the link database 404. In this example, a request to link a given payment instrument to a given user account has been provided and the orchestrator 402 may initiate a response to that request by sending the start process command to the link database 404 along with a request for a card verification link identifier.

At step 452, the link database 404 may return the requested card verification link identifier to the orchestrator 402. The card verification link identifier may be an identifier for the linking session that is in progress and may also be an indicator that the payment instrument in question has not been previously linked to the user account and/or that the previous link has expired or that a new link is otherwise to be established.

At step 454, the orchestrator 402 may send a capture instruction to the user device 102. The capture instruction may be data utilized by the user device 102 to display a request for the user to capture one or more images of the payment instrument from a given first perspective. Additional details are provided in FIG. 1 for the capture instruction, the perspective, and how user interfaces of the user device 102 are utilized to instruct a user on how to position the payment instrument to acquire the images to be utilized for image processing.

At step 456, the user device 102 may display the capture instruction and a camera of the user device 102 may enable and may be utilized to capture the one or more images of the payment instrument from the first perspective. Once the thresholds and requirements described with respect to FIG. 2 are satisfied for the images of the first perspective of the payment instrument, corresponding image data may be generated and sent to the orchestrator 402 in response to the capture instruction.

At step 458, the orchestrator 402 may send a save image command to the token component 406, which receive the save image command and may, in response thereto, generate a token to be associated with the image in question. The token may be in any tokenized format and may identify the image and/or set of images that are associated with the linking session in question and the first perspective of the payment instrument. In some examples, the token may be encrypted such that the token may be decrypted by authorized devices and systems.

At step 460, the token component 406, having generated the token as described above, may send the token back to the orchestrator 402 in response to the save image command. The orchestrator 402 may then associate the token as received from the token component 406 with the image(s) of the first perspective of the payment instrument such that the token may be utilized as an identifier of the image(s) during further processing.

At step 462, the orchestrator 402 may send a save token command to the customer database 408. The customer database 408 may be a database stored in the datastore 134 described with respect to FIG. 1. The customer database 408 may store, in addition to the tokens described herein, information associated with the user (e.g., customer) at issue, including the user account to be linked to the payment instrument, risk metrics as described in FIG. 1, etc.

At step 464, the customer database 408 may return to the orchestrator 402 and in response to the save token command a customer file identifier, which may identify the user (e.g., customer) at issue and associate that user with the generated token and the image(s) of the payment instrument from the first perspective. At this point, the images and the customer file identifier may be associated with each other utilizing the generated token in a secure manner such that personally identifiable information about the user in question and/or the payment instrument is not accidentally associated with different accounts and/or users.

At step 466, the orchestrator 402 may send a store image payload command to the payload database 410. This command may cause the payload database 410 to store the image(s) associated with the first perspective of the payment instrument to be utilized for image analysis during later operations. Additionally, the stored image(s) may be utilized as reference images for subsequent payment instrument linking requests and/or for payment instrument verification or fraud detection.

At step 468, the payload database 410 may return a payload identifier to the orchestrator 402 indicating a location within the payload database 410 for where the image(s) of the first perspective of the payment instrument have been stored.

The processes described with respect to steps 454 through 468 may then be repeated one or more times to acquire image(s) of the payment instrument from one or more other perspectives. An example of this is provided at steps 470 through 484 where a capture instruction for image(s) of a second perspective of the payment instrument is sent to the user device 102, the user device 102 may capture the second perspective images, and then a token, customer file identifier, and payload identifier at steps 472 through 484. At this point, image processing on the image data and/or a 3D model of the image data may be performed as described more fully with respect to FIG. 1.

At step 486, the orchestrator 402 may send a command to create a new manual method to the verification database 412. This command may be an indication that the payment instrument at issue is requested to be utilized in a transaction and personal account number information for the payment instrument was manually entered or in other words a transaction was initiated where the payment instrument itself was not utilized to provide information for approving the transaction.

At step 488, the verification database 412 may send a verification identifier for the verification session in question back to the orchestrator 402 in response to the command to create the new manual method. Additional operations associated with the process 400 are now provided at FIG. 4B for readability as between FIG. 4A and FIG. 4B, but it should be understood that all of the operations in FIGS. 4A and 4B may be part of the same process 400.

Figure 4B:
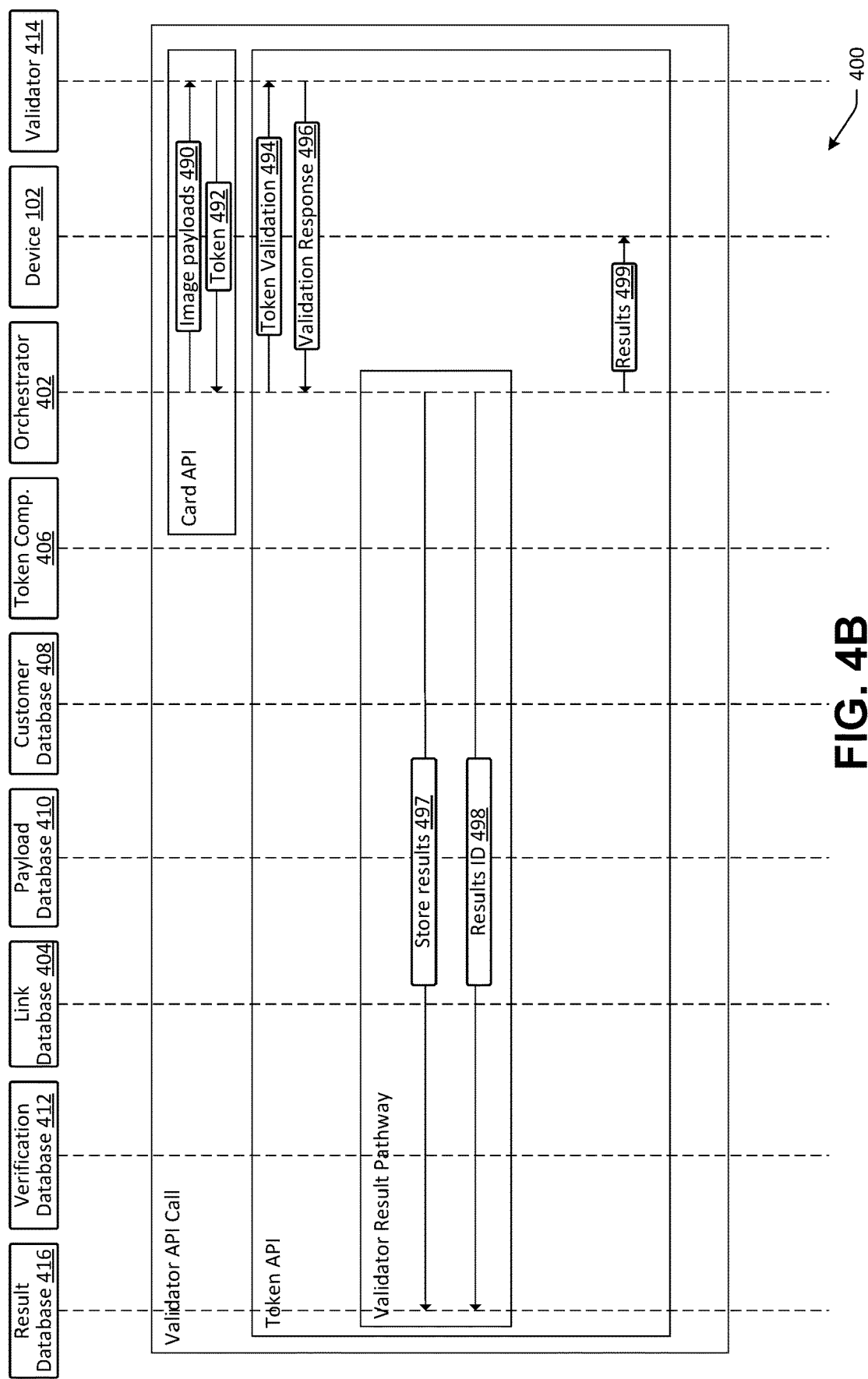
FIG. 4B is a continuation of the example process shown in FIG. 4A.

FIG. 4B is a continuation of the example process shown in FIG. 4A. The order in which the operations or steps are described is not intended to be construed as a limitation, and any number of the described operations may be combined in any order and/or in parallel to implement process 400. The process 400 may be performed by various components as shown in FIG. 4B, including an orchestrator 402, a link database 404, a token component 406, a customer database 408, a payload database 410, a verification database 412, a validator 414, and/or a result database 416, as well as a user device 102 as described with respect to FIG. 1.

Continuing from step 488 described with respect to FIG. 4A, at step 490 of FIG. 4B, the orchestrator 402 may send a validation API call to the validator 414. The validation API call may initiate the process for comparing acquire images of the payment instrument at issue with stored information known about the payment instrument and/or the user account. Additional details on the comparison of such data is provided with respect to the comparison component 126 of FIG. 1.

At step 492, the validator 414 may respond to the validation API call with a token. The token provided by the validator 414 may identify the validation session at issue as well as to act as a check that the validation results generated by the validator 414 are associated with the user account at issue.

At step 494, the orchestrator 402 may send data indicating token validation to the validator 414, which may utilize such data to determine that the validation results are in fact associated with the appropriate user account and that the validation results can be sent to the orchestrator 402 for ultimate display to a user of the user device 102.

At step 496, the validator 414 may send the validation response to the orchestrator 402. The validation response may include an indication of whether the payment instrument as displayed in the images has been validated to perform the requested action at issue, such as to utilize the payment instrument for a transaction.

At step 497, the orchestrator 402 may send a command to store the results to the results database 416. The results database 416 may receive the command and may store the validation results in association with the user account at issue. The validation results as stored may include an indication of whether the payment instrument was validated as well as data indicating a reason for such a determination and/or the underlying data utilized to make the determination. This data may be called upon at a later time to generate a training database for one or more machine learning models that may be utilized to perform the image processing and data comparisons described herein.

At step 498, the results database 416 may return a results identifier to the orchestrator 402. The results identifier may indicate a location within the results database 416 where the validation results are stored and can be retrieved at a later time.

At step 499, the orchestrator 402 may send the validation results to the user device 102. The validation results or a portion thereof may be displayed utilizing a user interface of the user device 102 and, depending on the results, the user device 102 may perform an action associated with the validation results. Such actions may include linking the payment instrument to the user account, approving a transaction to be concluded using the payment instrument, determining if fraud is detected, etc.

Figure 5:
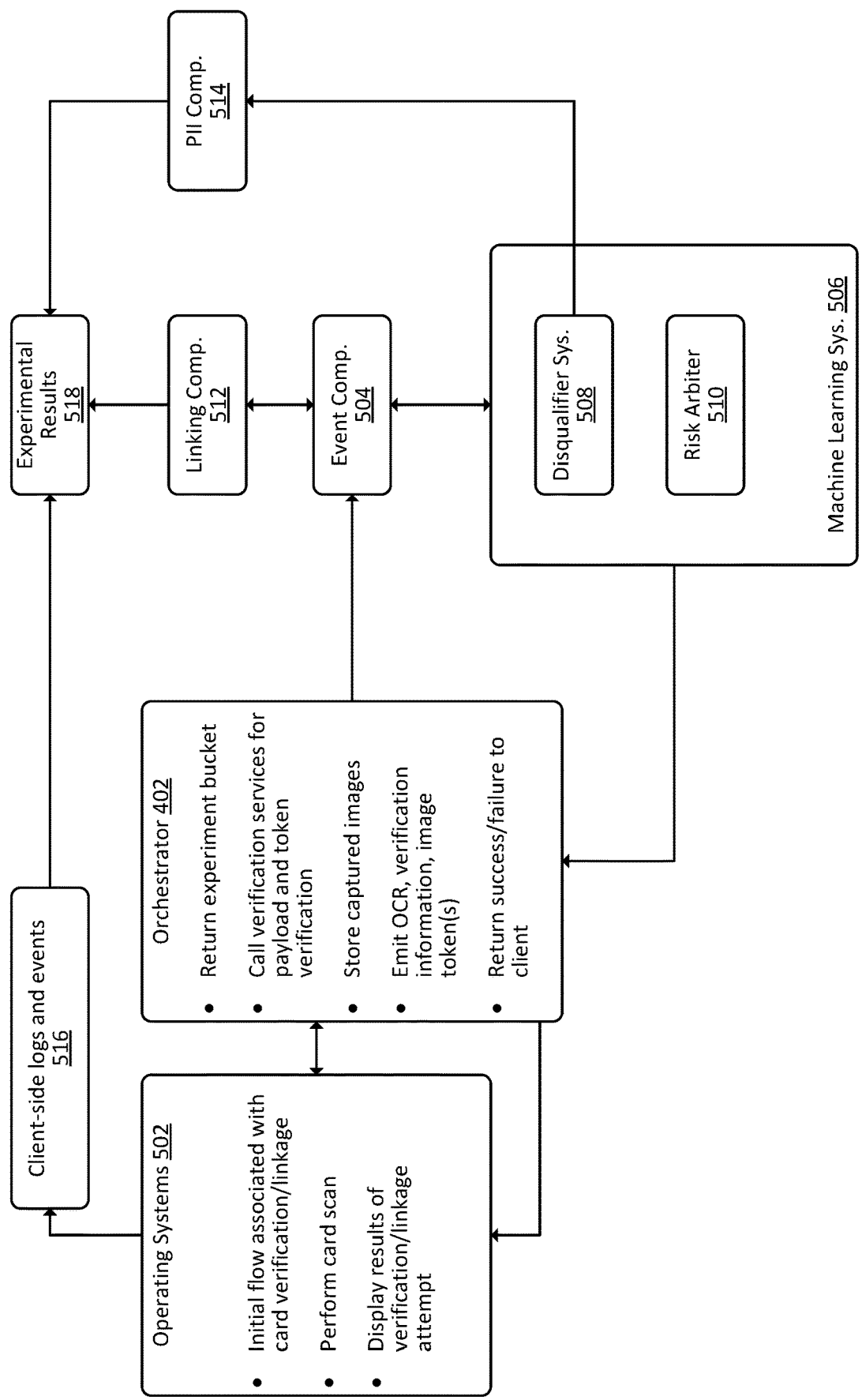
FIG. 5 is an example conceptual diagram of example components utilized for detecting fraudulent activity associated with payment instruments, according to an embodiment described herein.

FIG. 5 is an example conceptual diagram of example components utilized for detecting fraudulent activity associated with payment instruments, according to an embodiment described herein. FIG. 5 may include one or more components described with respect to other figures illustrated herein, including the orchestrator 402 described with respect to FIG. 4. Additional components of FIG. 5 may include one or more operating systems 502 of user devices, an event component 504, a machine learning system 506 (which may include a disqualifier system 508 and a risk arbiter 510), a linking component 512, a personal identifying information (PII) component 514, client-side logs and events 516, and/or experimental results 518. The components described with respect to FIG. 5 may be considered components of the payment service 104, and particularly may make up components of the image processing component 144 and/or the comparison component 146. Each of these components will be described in detail below.

For example, initiation of a process of validating a given payment instrument and/or for linking that payment instrument to a user account may occur at the operating systems 502. While this disclosure includes the use of any operating system 502 on a user device, example operating systems 502 may include Android® and iOS®. The operations performed by the operating systems 502 of the user device may include display of user interfaces for presenting instructions associated with acquisition of payment instrument images, capturing such images via a card scan as described more fully herein, and generating corresponding image data, by way of example.

This image data may be sent to the orchestrator 402, which may be responsible for coordinating with other components of the system to return an experiment bucket associated with experimental data for image analysis as described herein, for calling verification components and systems for image payload and token identifiers as described in more detail with respect to FIGS. 4A and 4B, for storing captured images, for emitting OCR, computer vision analysis, verification information, and image tokens, and eventually for returning success and/or failure indication to the operating systems 502 of the user device, which may display such results.

As part of these processes, the orchestrator 402 may send an indication that a linking request has been initiated to the event component 504. The event component 504 may queue and handle linking requests and may be configured to communicate with the orchestrator 402 and other components to acquire information to perform the linking as requested if the payment instrument in question is validated.

The event component 504 may send some or all of this data to the machine learning system 506, which may utilize one or more machine learning models such as the machine learning models 140 described with respect to FIG. 1. The machine learning system 506 may be configured to utilize its risk arbiter 510 to determine one or more risk metrics associated with the user account at issue. Additional details on risk metrics and the generation of such risk metrics are provided at FIG. 1, but in general a given risk metric may indicate a likelihood that a nefarious or otherwise unintended action may be taken in association with a given user account, including having a payment instrument linked to a user account without authorization of the actual user account holder. These risk metrics may be sent from the machine learning system 506 to the orchestrator 402, which may utilize such information for determine how to instruct the user of the user device on capturing various perspectives of the payment instrument in question.

Additionally, the disqualifier system 508 may be utilized to determine whether to authorize the payment instrument linking request at issue. To do so, the disqualifier system 508 may utilize a comparison component, such as the comparison component 126 described with respect to FIG. 1. In examples where the comparison component 126 has previously received data associated with the payment instrument in question, that data may include any or all of the user account data mentioned above as well as any of the attributes of a payment instrument as described herein. This reference information may be stored in a datastore and may be compared to the payment instrument information acquired from the image data and/or the 3D models described herein to determine similarities and differences therebetween. For example, the comparison component 126 may determine whether the acquired card identifier, expiration date, and security code matches with stored data. By way of continued example, a comparison between a signature of the user and a stored representation of the signature associated with the user account may also be performed. In this example, when information about the payment instrument has been previously acquired, the signature on the payment instrument may already be known to the comparison component 126 and thus an attempt at a one-to-one comparison that matches the acquired signature with a known reference signature may be performed. In other examples where a signature of the user is stored in the datastore but that signature is not necessarily associated with the payment instrument at issue (e.g., the reference signature is from another payment instrument), the comparison component 126 may attempt to determine similarities and differences between the acquired signature and the reference signature. Similarity thresholds, which may be dynamic, may be established for determining when the acquired information from the payment instrument sufficiently matches the stored information such that one or more actions can be taken by the payment service and/or the payment application.

If the payment instrument is validated, an indication of this result may be sent to the linking component 512, which may be configured to associate (or otherwise link) the payment instrument to the user account in question. At this point, the payment application residing on the user device may be configured to display an indication that the payment instrument is associated with the user account and may provide functionality for the use of the payment instrument in association with the payment application.

Additionally, the outcomes of the comparisons described herein may be provided to the PII component 514, which may be configured to determine which portions of the results and/or the underlying data utilized to generate the results constitutes personally identifying information. This information may be redacted, obscured, or removed by the PII component 514 such that the data indicated as the experimental results 518 does not include personally identifying information. These experimental results 518 may be utilized as a training database for the machine learning models described herein and/or for changing any of the operations described herein for obtaining/generating payment instrument image(s) and 3D models and then utilizing the same to validate those payment instruments against known information.

Figure 6:
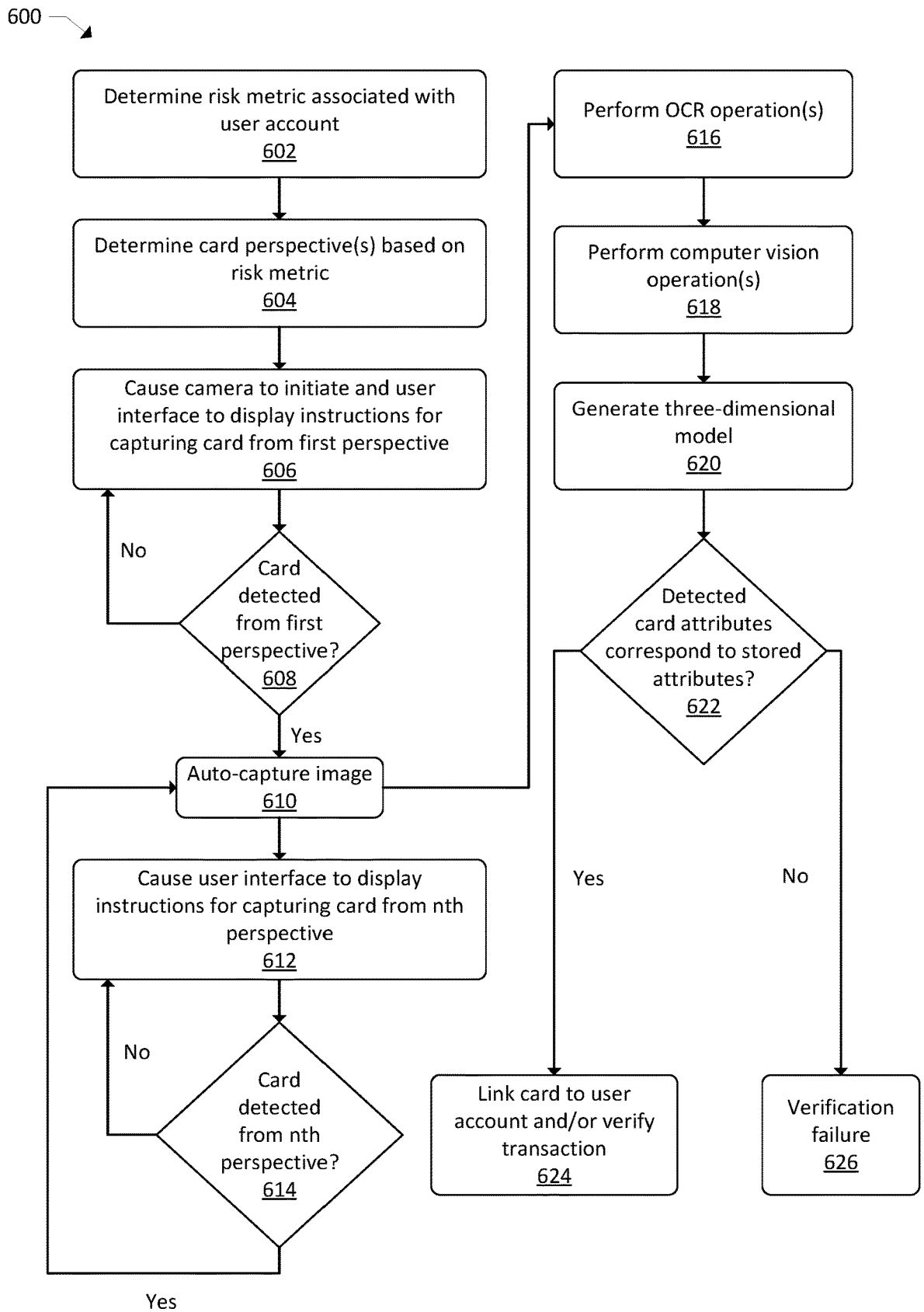
FIG. 6 is a flow diagram showing an example process for capturing images of a payment instrument and utilizing those images to determine whether to link a payment instrument to a user account and/or whether to determine that fraudulent activity is occurring, according to an embodiment described herein.

FIG. 6 is an example process associated with recognition techniques as described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 7-14, although the processes may be implemented in a wide variety of other environments, architectures and systems.

FIG. 6 is a flow diagram showing an example process 600 for capturing images of a payment instrument and utilizing those images to determine whether to link a payment instrument to a user account and/or whether to determine that fraudulent activity is occurring, according to an embodiment described herein. The order in which the operations or steps are described is not intended to be construed as a limitation, and any number of the described operations may be combined in any order and/or in parallel to implement process 600.

At block 602, the process 600 may include determining a risk metric associated with a user account. For example, to determine the risk metric for a given user account, details associated with the user account may be utilized and input into a model, which may be a trained machine learning model. The details may be any details known to the payment service described herein about the user account, but by way of example could be the user's name, addresses, contact information, merchants that the user has transacted with, how long the user account has been active, whether the user account has been associated with fraudulent activity in the past, a number of services utilized by the user account, social network data associated with the user account, the type of transaction at issue, a number of other payment instruments that are linked to the user account, etc. The model may be configured to intake some or all of this information and to determine a risk metric for the user account. The risk metric may be in the form of a numerical value that is associated with a scale, such as a risk metric of 4 on a scale of 1 to 5 with 1 being low risk and 5 being high risk. It should be understood that the risk metric may take any form and the scale may also take any form.

At block 604, the process 600 may include determining one or more card perspectives based at least in part on the risk metric. For example, the instruction to scan the payment instrument in various perspectives may be based at least in part on a risk metric associated with the user account at issue. For example, the number of perspectives to be captured, as well as the types of perspectives themselves may be determined based at least in part on the risk metric. In a specific example, a risk metric indicating low risk of fraudulent activity may request that a single perspective of the payment instrument (e.g., the front of the payment instrument) be captured. In another example, a risk metric indicating high risk of fraudulent activity may request that a complete scan of all sides of the payment instrument be made such that a 3D model of the payment instrument can be generated.

At block 606, the process 600 may include causing a camera to initiate and a user interface to display instructions for capturing images of the payment instrument from the determined perspectives. For example, a payment application, in some examples, may cause a camera of the user device to enable and/or for a camera application installed on the user device to enable in order to acquire the images described herein. The user interface may display information to assist the user in acquiring images of the payment instrument for analysis purposes. For example, the instructions may request that the user position the payment instrument in a certain way and within a given portion of the field of view of the camera. A template may also be displayed on the user interface to provide the user with a visual instruction for what the payment instrument should look like when viewed by the camera.

At block 608, the process 600 may include determining whether the card was detected from a first perspective with respect to a field of view of the camera. For example, a live or near live image analysis of the images captured by the camera may be performed and certain attributes of the displayed card may be analyzed to determine whether the card is being captured from the first perspective or not and/or whether an angle and/or orientation of the card is appropriate for image analysis.

In examples where the card is not detected, the process 600 may return to block 608 where the user device and/or the payment application described herein may continue to determine whether the card is detected from the first perspective. This portion of the process 600 may include augmenting the instructions displayed to the user to assist in acquiring images of the card from the first perspective, such as instructing the user to change an angle and/or orientation of the card, flipping the card over, adjusting lighting, etc.

In examples where the card is detected from the first perspective, the process 600 may include, at block 610, auto-capturing one or more images of the card from the first perspective. For example, when the payment application detects that the payment instrument has been placed within a field of view of the camera as instructed and the given perspective of the payment instrument is being viewed, the payment application may cause the camera of the user device to automatically (or otherwise without requiring user input) to capture one or more images and to generate corresponding image data.

At block 612, the process 600 may include causing the user interface to display instructions for capturing the card from one or more other perspectives. This process may be performed in the same or a similar manner as that described in block 606, except that the instructions may be for capturing the card from the one or more other perspectives instead of from the first perspective.

At block 614, the process 600 may include determining whether the card is detected from the one or more other perspectives. This process may be performed in the same or a similar manner as that described in block 608, except that the determination may be in relation to the one or more other perspectives instead of from the first perspective.

In examples where the card is not detected from the one or more other perspectives, the process 600 may return to block 612 where the user device and/or the payment application may continue to monitor the images from the camera until the card is detected from the one or more other perspectives.

In examples where the card is detected from the one or more other perspectives, the process 600 may continue to block 610, where images of the payment instrument from the one or more other perspectives may be auto-captured.

At block 616, the process 600 may include performing OCR operations on the image data. For example, the image data of the payment instrument may be analyzed in one or more ways to extract information about the payment instrument. Example analysis techniques include OCR processing where the data is analyzed to first determine portions of the data that correspond to text and then to recognize the textual characters in that portion of the data. By way of example, a payment instrument may have on one or more of its surfaces various types of text. Those textual portions may include a card identifier, an expiration date, a bank or other institution associated with the payment instrument, a card issuer name, a classification of the payment instrument such as "platinum," "signature," "preferred," etc., the cardholder's name, a security code, website addresses, telephone numbers, a signature of the cardholder, membership numbers, membership dates, etc. Each of these textual portions of the payment instrument may be identified utilizing the OCR processing described herein and the text of each of these portions may be analyzed to identify the text itself.

At block 618, the process 600 may include performing computing vision operations on the image data. For example, the computer vision processing may include detecting where objects depicted on the payment instrument are identified and/or where characteristics of the payment instrument itself are determined (e.g., thickness, embossing, etc.). For example, the issuer of the payment instrument and/or one or more other entities associated with the payment instrument may place trademarks or other branding on the payment instrument. Other objects may include a NFC chip embedded in the payment instrument, designs and/or artwork placed on the payment instrument, a photograph of the cardholder, symbols associated with tap-to-pay functionality, a magnetic strip for swipe-to-pay functionality, one or more barcodes, one or more QR codes, etc. In addition to the objects depicted on the payment instrument, the characteristics of the payment instrument itself may include, for example, a thickness of the payment instrument, a card of the payment instrument, a size and/or shape of the payment instrument, a degree of embossing and/or concavity of text shown on the payment instrument, etc. The computer vision processing described herein may be utilized to identify some or all of these attributes of the payment instrument in question and to extract that information from image data of the payment instrument.

At block 620, the process 600 may include generating a 3D model based at least in part on the image data. For example, once image data corresponding to the different perspectives of the payment instrument is generated, in examples, the image data may be utilized by an image processing component to generate a 3D model of the payment instrument. The 3D model may be data that meshes the various images together such that a complete or near complete digital representation of the payment instrument is generated. The 3D model, in addition to depicting information found on the payment instrument (e.g., a card identifier), may also indicate other physical attributes of the payment instrument such as thickness, curvature, embossing, holographic images, etc. For example, each image of the payment instrument that is captured may initially be analyzed to identify coordinates for each portion of the payment instrument. Doing so may allow the image processing component to map identifying data of the payment instrument to the payment instrument itself and allows the image processing component to identify a similar portion of the payment instrument as between multiple images such that the images may be meshed together to form the 3D model.

In addition to the 3D model generation described herein, which is focused on generating a digital representation of the surface of the payment instrument in question, additional data may be acquired from certain payment instruments. For example, some payment instruments may include a NFC chip embedded therein and the user device may include a NFC reader device that may scan the payment instrument and acquire data from the NFC chip therein. Other examples of acquiring data from the payment instrument that is not necessarily image data may include doing so utilizing QR codes, RFIDs, etc. This information may be acquired and included in the 3D model.

At block 622, the process 600 may include determining whether detected card attributes from the image data and/or from the 3D model correspond to stored card attributes. For example, a comparison component may not have previously received data about the payment instrument in question but information about the user account may have been previously known. Such user account information may include, for example, a user name, a payment instrument issuer that the user is associated with, an image of the user, an indication that the user is associated with payment instruments that include NFC chips or not, a user address and/or other contact information, etc. In examples where the comparison component has previously received data associated with the payment instrument in question, that data may include any or all of the user account data mentioned above as well as any of the attributes of a payment instrument as described herein. This reference information may be stored in a datastore and may be compared to the payment instrument information acquired from the image data and/or the 3D model to determine similarities and differences therebetween. For example, the comparison component may determine whether the acquired card identifier, expiration date, and security code matches with stored data. By way of continued example, a comparison between a signature of the user and a stored representation of the signature associated with the user account may also be performed. In this example, when information about the payment instrument has been previously acquired, the signature on the payment instrument may already be known to the comparison component and thus an attempt at a one-to-one comparison that matches the acquired signature with a known reference signature may be performed. In other examples where a signature of the user is stored in the datastore but that signature is not necessarily associated with the payment instrument at issue (e.g., the reference signature is from another payment instrument), the comparison component may attempt to determine similarities and differences between the acquired signature and the reference signature. Similarity thresholds, which may be dynamic, may be established for determining when the acquired information from the payment instrument sufficiently matches the stored information such that one or more actions can be taken by the payment service and/or the payment application.

In examples where the detected attributes correspond with the stored attributes, the process 600 may include, at block 624, linking the card at issue to the user account and/or verifying a transaction where the card is attempting to be used. Linking of the card to the user account may include generating an association between the card and the user account indicating that when the user account is utilized the payment instrument is authorized for use.

In examples where the detected attributes do not correspond with the stored attributes, at least to a threshold degree, the process 600 may include, at block 626, detecting a verification failure. One example of a verification failure may include determining that fraudulent activity may be occurring and may indicate that the attempt to link the card at issue is being made to a user account that is not associated with the payment instrument. An example of this may be if the payment instrument information is nefariously taken by an unauthorized user and that user is trying to link the payment instrument information to the user's account without actually having the payment instrument in hand. Other verification failures may not be associated with fraudulent activity, but may indicate that the comparison between the detected attributes and the stored attributes indicates that verification of the object in question does not satisfy a verification threshold as described above.

Figure 7:
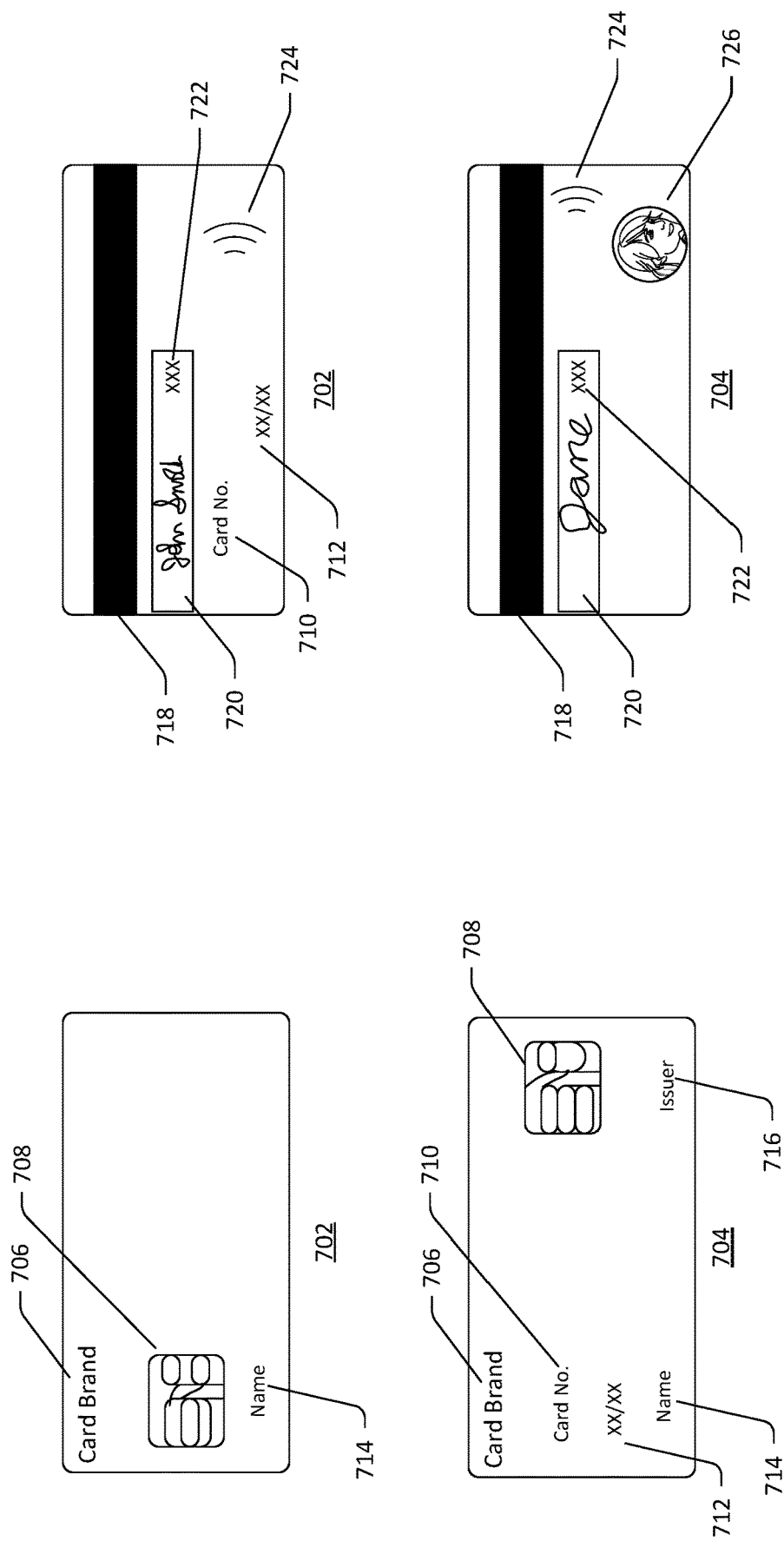
FIG. 7 is a conceptual diagram of example payment instruments with differing attributes that may be analyzed by the character recognition system described herein to link payment instruments to user accounts and/or to detect fraudulent activity, according to an embodiment described herein.

FIG. 7 is a conceptual diagram of example payment instruments with differing attributes that may be analyzed by the character recognition system described herein to link payment instruments to user accounts and/or to detect fraudulent activity, according to an embodiment described herein.

As shown in FIG. 7, several perspectives of different types of payment instruments are shown. Each of the payment instruments has example attributes that differ among the payment instruments, and those attributes and differences will be described by way of example below. Starting with payment instrument 702, the payment instrument 702 is illustrated first with respect to a front perspective of the payment instrument 702. From this perspective, the attributes of the payment instrument 702 illustrated in FIG. 7 include a card brand 706, a NFC chip 708, and a cardholder name 714. While the payment instrument 702 may have other attributes that those specifically called out here, these attributes are described herein by way of example.

Another payment instrument 704 is also shown in FIG. 7 and includes some attributes that are similar to those of the payment instrument 702 but also includes some attributes that differ from the attributes of the payment instrument 702. For example, the front side of the payment instrument 704 includes the card brand 706, the NFC chip 708, a card identifier 710, an expiration date 712, a cardholder name 714, and an issuer identifier 716. Additionally, while some of the attributes are shared as between the payment instrument 702 and the payment instrument 704, the position of those attributes relative to other attributes and to the payment instrument 702, 704 itself may differ. For example, while a NFC chip 708 is disposed on the front side of both payment instruments 702, 704, on the first payment instrument 702 the NFC chip 708 is disposed on one side while the NFC chip 708 is disposed on the other side for the second payment instrument 704.

Additionally, attributes of the payment instruments 702, 704 may be found on the back side and/or other sides of the payment instruments 702, 704. With respect to the first payment instrument 702, it may include a magnetic strip 718, a signature 720, a security code 722, a tap-to-pay indicator 724, as well as some information that may be found on a front side of other payment instruments, such as a card identifier 710 and/or an expiration date 712. With respect to the second payment instrument 704, it may include a magnetic strip 718, a signature, a security code 722, and a tap-to-pay indicator 724, but some of those attributes may be positioned differently than the positioning of those attributes with respect to the first payment instrument 702. Additionally, the second payment instrument includes a user photo 726, which is unique to the second payment instrument 704 in comparison to the first payment instrument 702. Also, as noted in FIG. 7, while a user signature 720 is found on both the first payment instrument 702 and the second payment instrument 704, those signatures may differ both in terms of the textual characters that make up the signature but also with respect to handwriting styles, portions of the signatures that fall inside and outside the signature box, positioning of the signatures in the signature boxes themselves, etc.

These and other attributes of payment instruments 702, 704 may be utilized to perform a comparison between acquired payment instrument information from image data and/or 3D models of payment instruments and stored data associated with user accounts and/or known payment instruments. Additional details on this comparison are provided above with respect to FIG. 1.

Figure 8:
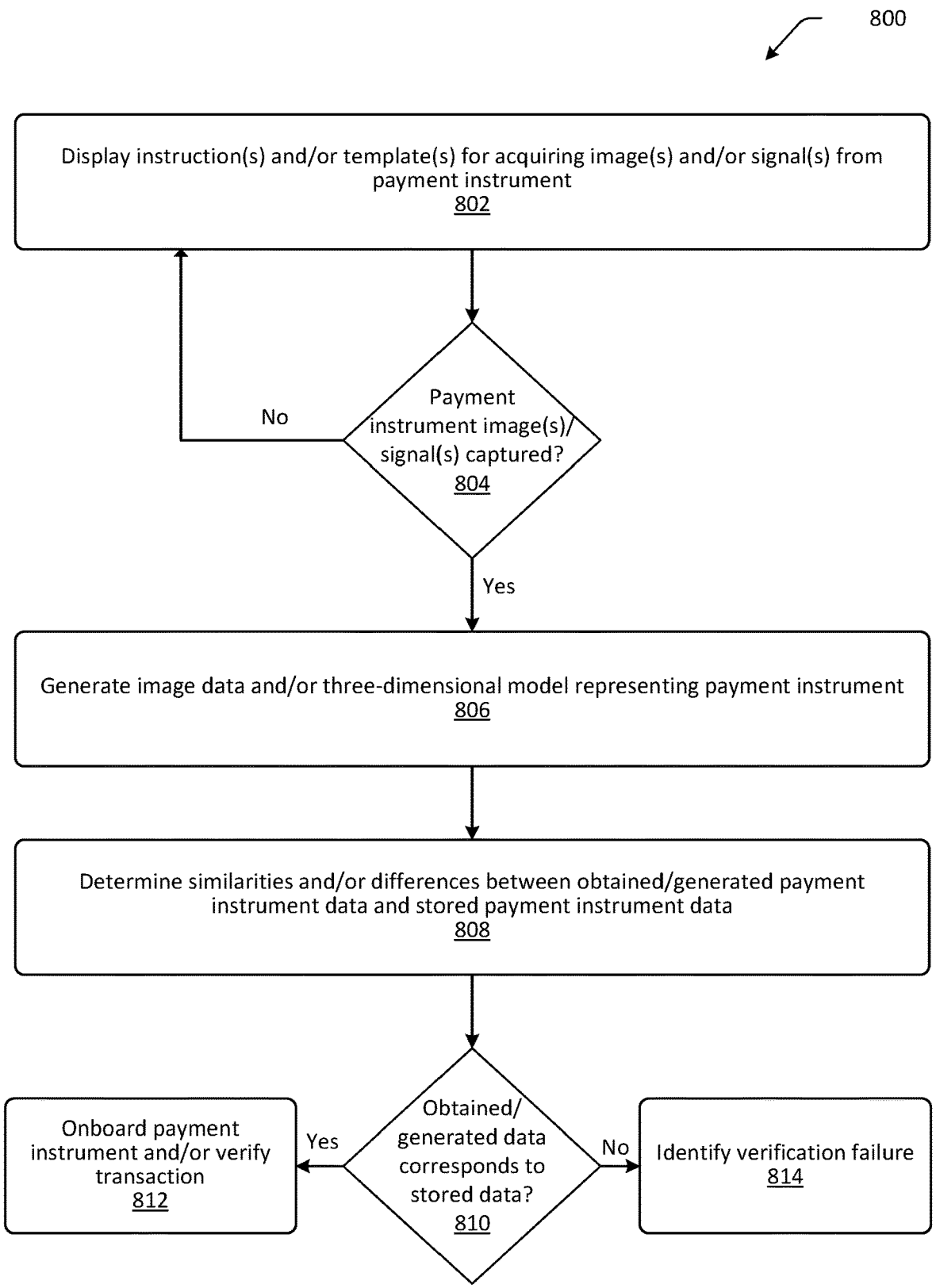
FIG. 8 is a flow diagram showing an example process for utilizing images of a payment instrument to link the payment instrument with a user account, to verify a transaction, and/or to detect fraud.

FIG. 8 is an example process associated with recognition techniques as described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 9-14, although the processes may be implemented in a wide variety of other environments, architectures and systems.

FIG. 8 is a flow diagram showing an example process 800 for utilizing images of a payment instrument to link the payment instrument with a user account, to verify a transaction, and/or to detect fraud. The order in which the operations or steps are described is not intended to be construed as a limitation, and any number of the described operations may be combined in any order and/or in parallel to implement process 800.

At block 802, the process 800 may include displaying instructions and/or templates for acquiring one or more images and/or signals from a payment instrument. Initiation of this process may be based at least in part on a request to link the payment instrument with a user account and/or to utilize the payment instrument for a transaction. In some examples, these types of trigger event may cause a risk metric associated with the user account and/or the transaction at issue to be determined. Additional details on risk metric generation are provided above with respect to FIG. 1.

In these examples, when the risk metric is great enough, the process of validating the payment instrument through recognition techniques as described herein may be initiated and data representing the instructions and/or templates may be received at the user device in response to such a risk metric determination.

A payment application, in some examples, may cause a camera of a user device to enable and/or for a camera application installed on the user device to enable in order to acquire the images described herein. The user interface may display information to assist the user in acquiring images of the payment instrument for analysis purposes. For example, the instructions may request that the user position the payment instrument in a certain way and within a given portion of the field of view of the camera. A template may also be displayed on the user interface to provide the user with a visual instruction for what the payment instrument should look like when viewed by the camera.

When the payment application detects that the payment instrument has been placed within a field of view of the camera as instructed and the given perspective of the payment instrument is being viewed, the payment application may cause the camera of the user device to automatically (or otherwise without requiring user input) to capture one or more images and to generate corresponding image data. This process may be repeated, in examples, one or more times where different perspectives of the payment instrument are to be acquired. In some examples, instead of acquiring a single image of each perspective of the payment instrument, a scan of the payment instrument may be performed where multiple images are captured similar to a video of the payment instrument from the multiple perspectives.

At block 804, the process 800 may include determining whether the payment instrument images and/or signals have been accurately captured by a camera of a user device. For example, a live or near live image analysis of the images captured by the camera may be performed and certain attributes of the displayed card may be analyzed to determine whether the card is being captured from the first perspective or not and/or whether an angle and/or orientation of the card is appropriate for image analysis.

In examples where such payment instrument images and/or signals have not been accurately captured, the process 800 may return to block 802 where the instructions and/or templates may continue to be displayed and/or may be augmented to assist a user in acquiring the images and/or signals. In this example, if a certain amount of time has passed between when the instructions were displayed and when an accurate image is acquired for the perspective(s) requested, the instructions may be changed to indicate to the user that the user should take additional and/or different action to acquire images of the appropriate perspective and with sufficient quality to be analyzed. Additional details on this determination are provided by way of example with respect to FIG. 2.

In examples where the payment instrument images and/or signals have been accurately captured, the process 800 may include, at block 806, generating image data and/or a 3D model representing the payment instrument. For example, the camera, the camera application, and/or the payment application may generate image data that corresponds to the captured images. Additionally, the user device and/or an associated payment service system may generate a 3D model of the payment instrument utilizing the image data. The 3D model may be data that meshes the various images together such that a complete or near complete digital representation of the payment instrument is generated. The 3D model, in addition to depicting information found on the payment instrument (e.g., a card identifier), may also indicate other physical attributes of the payment instrument such as thickness, curvature, embossing, holographic images, etc. For example, each image of the payment instrument that is captured may initially be analyzed to identify coordinates for each portion of the payment instrument. Doing so may allow an image processing component to map identifying data of the payment instrument to the payment instrument itself and allows the image processing component to identify a similar portion of the payment instrument as between multiple images such that the images may be meshed together to form the 3D model.

In addition to the 3D model generation described herein, which is focused on generating a digital representation of the surface of the payment instrument in question, additional data may be acquired from certain payment instruments. For example, some payment instruments may include a NFC chip embedded therein and the user device may include a NFC reader device that may scan the payment instrument and acquire data from the NFC chip therein. Other examples of acquiring data from the payment instrument that is not necessarily image data may include doing so utilizing QR codes, RFIDs, etc. This information may be acquired and included in the 3D model.

In some examples, the 3D model may be presented to the user via the user device and an option for receiving user input to augment the 3D model may be presented. This option may be selected by a user of the user device and portions of the 3D model may be selected for augmentation. When augmented, the image processing component may perform additional analysis on the image data to determine if the image data indicates correspondence between the images of the payment instrument and the changes to the 3D model as requested by the user input data.

At block 808, the process 800 may include determining similarities and/or differences between the obtained and/or generated payment instrument data and stored payment instrument data. In some examples, a comparison component may not have previously received data about the payment instrument in question but information about the user account may have been previously known. Such user account information may include, for example, a user name, a payment instrument issuer that the user is associated with, an image of the user, an indication that the user is associated with payment instruments that include NFC chips or not, a user address and/or other contact information, etc. In examples where the comparison component has previously received data associated with the payment instrument in question, that data may include any or all of the user account data mentioned above as well as any of the attributes of a payment instrument as described herein. This reference information may be stored in a datastore and may be compared to the payment instrument information acquired from the image data and/or the 3D model to determine similarities and differences therebetween. For example, the comparison component may determine whether the acquired card identifier, expiration date, and security code matches with stored data. By way of continued example, a comparison between a signature of the user and a stored representation of the signature associated with the user account may also be performed. In this example, when information about the payment instrument has been previously acquired, the signature on the payment instrument may already be known to the comparison component and thus an attempt at a one-to-one comparison that matches the acquired signature with a known reference signature may be performed. In other examples where a signature of the user is stored in the datastore but that signature is not necessarily associated with the payment instrument at issue (e.g., the reference signature is from another payment instrument), the comparison component may attempt to determine similarities and differences between the acquired signature and the reference signature. Similarity thresholds, which may be dynamic, may be established for determining when the acquired information from the payment instrument sufficiently matches the stored information such that one or more actions can be taken by the payment service and/or the payment application.

In some examples, receipt of the stored payment instrument data for comparison purposes may be based at least in part on the original risk metric determination described above, and this data may be received at the user device (when the user device is performing the image processing and data comparison operations) based at least in part on the risk metric determinations.

At block 810, the process 800 may include determining whether the obtained data corresponds to the stored data, at least to a threshold degree. For example, with respect to the similarity thresholds, some thresholds may be associated with an exact match. Examples of these exactly matching thresholds as between obtained data and stored data may be associated with card identifiers, expiration dates, security codes, data received from NFC chips, QR codes, etc., and other information that should be determined with near certainty. Other thresholds for other attributes of the payment instrument may indicate less confidence is needed to determine if there is sufficient similarity. For example, artwork on the surface of the payment instrument, exact locations of objects on the surface of the payment instrument, similarity of objects on the payment instrument, etc. may be associated with less confident thresholds at least because there may be some variance between the 3D model generated as described herein and stored reference information about a payment instrument and/or because as a user utilizes a payment instrument over time (e.g., by swiping, dipping, tapping, transferring the payment instrument in and out of a receptacle, accidentally washing/drying the payment instrument, etc.) the objects on the surface of the payment instrument may fade or become damaged. The thresholds described herein may account for such use over time and the thresholds may change over time.

The comparison component may also set a threshold percentage of the results that are to match for the information to be accepted. For example, if 3 of the 4 results indicate that the user name is "John Smith," but a single result indicated that the user name was "Jahn Smith," then the recognition technology may determine that 3 out of 4 is sufficient to declare a match. Unless other evidence within the payment server (e.g., other payment transactions, delivery address, invoices, or other identity documents registered with the payment server) indicates that the name is Jahn Smith.

The comparisons described herein may include comparison of attribute types and/or comparison of attribute values. For example, some comparisons may be based at least in part on determining if types of attributes determined from the obtained data correspond to the attribute types indicated by the stored data. In a specific example, the obtained data may indicate that a payment instrument has a card identifier, an expiration data, a security code, a cardholder name, and a magnetic stripe, while the stored data may indicate that the payment instrument has these attributes types as well as a NFC chip. In this example where the NFC chip is not detected in the image data, the comparison component may identify this difference even without determining whether the values associated with each attribute (e.g., the specific numbers of the credit card identifier) differ. In other examples, the values of the attributes themselves may be compared to determine similarities and differences between the obtained data and the stored data. Also, as described in more detail with respect to FIG. 9, one or more trained machine learning models may be utilized to perform the comparisons described herein.

In examples where the obtained data corresponds to the stored data, the process 800 may include, at block 812, onboarding the payment instrument and/or verifying a transaction to be made utilizing the payment instrument. On boarding the payment instrument may include linking the payment instrument in question to user account data such that a payment application may enable functionality of the payment application for use with the payment instrument. Verifying a transaction may include authorizing the payment instrument to be utilized to satisfy a cost of a transaction.

In examples where the obtained data does not correspond to the stored data, the process 800 may include, at block 814, identifying a verification failure. A verification failure may indicate that the payment instrument is not authorized to be linked to the requested user account and/or that the payment instrument is not authorized to be utilized to satisfy a cost of a transaction. In examples, the verification failure may correspond to detection of fraudulent activity and the user device and/or the payment service may take additional actions to mitigate the fraudulent activity, such as reporting the fraudulent activity, suspending the user account, requesting additional information, etc.

Figure 9:
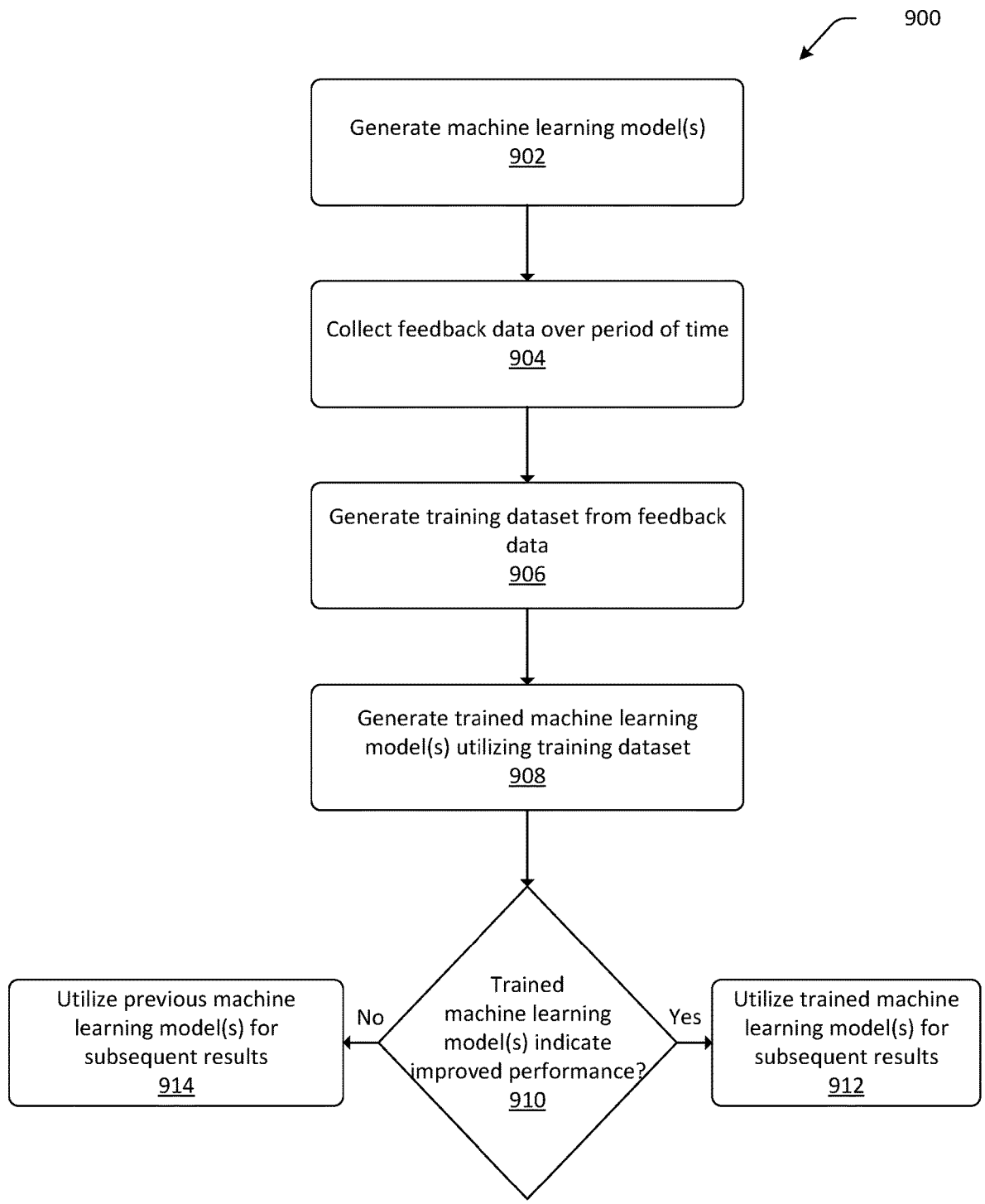
FIG. 9 is a flow diagram of an example process for generating and/or training machine learning models to perform one or more of the processes described herein, according to an embodiment described herein.

FIG. 9 is a flow diagram of an example process 900 for the generation and training of machine learning models to perform one or more of the processes described herein, according to an embodiment described herein. The order in which the operations or steps are described is not intended to be construed as a limitation, and any number of the described operations may be combined in any order and/or in parallel to implement process 900.

At block 902, the process 900 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore(s) 134, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 904, the process 900 may include collecting feedback data over a period of time. The feedback data may include any of the data described with respect to the datastore(s) 134, any data associated with image analysis and/or comparison described herein, any data described with respect to FIGS. 1-8, or any other data that may be utilized to perform the operations described herein. This information may include factors associated with determining the number and/or types of perspectives to instruct the user to acquire of the payment instrument, determining the risk metrics described herein, determining whether to generate a 3D model of the payment instrument, determining how to generate the 3D model, identifying objects and/or text portions of the payment instrument, performing the comparison as between acquired payment instrument information and stored reference payment instrument information, determining the similarity thresholds described herein, detect fraudulent activity, etc.

At block 906, the process 900 may include generating a training dataset from the feedback data. Generation of the training dataset may include formatting the feedback data into input vectors for the machine learning model to intake, as well as associating the various data with the outcomes of the processes described herein.

At block 908, the process 900 may include generating one or more trained machine learning models utilizing the training dataset. Generation of the trained machine learning models may include updating parameters and/or weightings and/or thresholds utilized by the models to determine the number and/or types of perspectives to instruct the user to acquire of the payment instrument, determine the risk metrics described herein, determine whether to generate a 3D model of the payment instrument, determine how to generate the 3D model, identify objects and/or text portions of the payment instrument, perform the comparison as between acquired payment instrument information and stored reference payment instrument information, determine the similarity thresholds described herein, detect fraudulent activity, etc.

At block 910, the process 900 may include determining whether the trained machine learning models indicate improved performance metrics. For example, a testing group may be generated where the outcomes of the image analyses are known but not to the trained machine learning models. The trained machine learning models may generate results, which may be compared to the known results to determine whether the results of the trained machine learning model produce a superior result than the results of the machine learning model prior to training.

In examples where the trained machine learning models indicate improved performance metrics, the process 900 may include, at block 912, utilizing the trained machine learning models for generating subsequent results. For example, the trained machine learning models may be utilized to determine the number and/or types of perspectives to instruct the user to acquire of the payment instrument, determine the risk metrics described herein, determine whether to generate a 3D model of the payment instrument, determine how to generate the 3D model, identify objects and/or text portions of the payment instrument, perform the comparison as between acquired payment instrument information and stored reference payment instrument information, determine the similarity thresholds described herein, detect fraudulent activity, etc. It should be understood that the trained machine learning models may be utilized in any scenario where models are utilized as described herein.

In examples where the trained machine learning models do not indicate improved performance metrics, the process 900 may include, at block 914, utilizing the previous iteration of the machine learning models for generating subsequent results.

Figure 10:
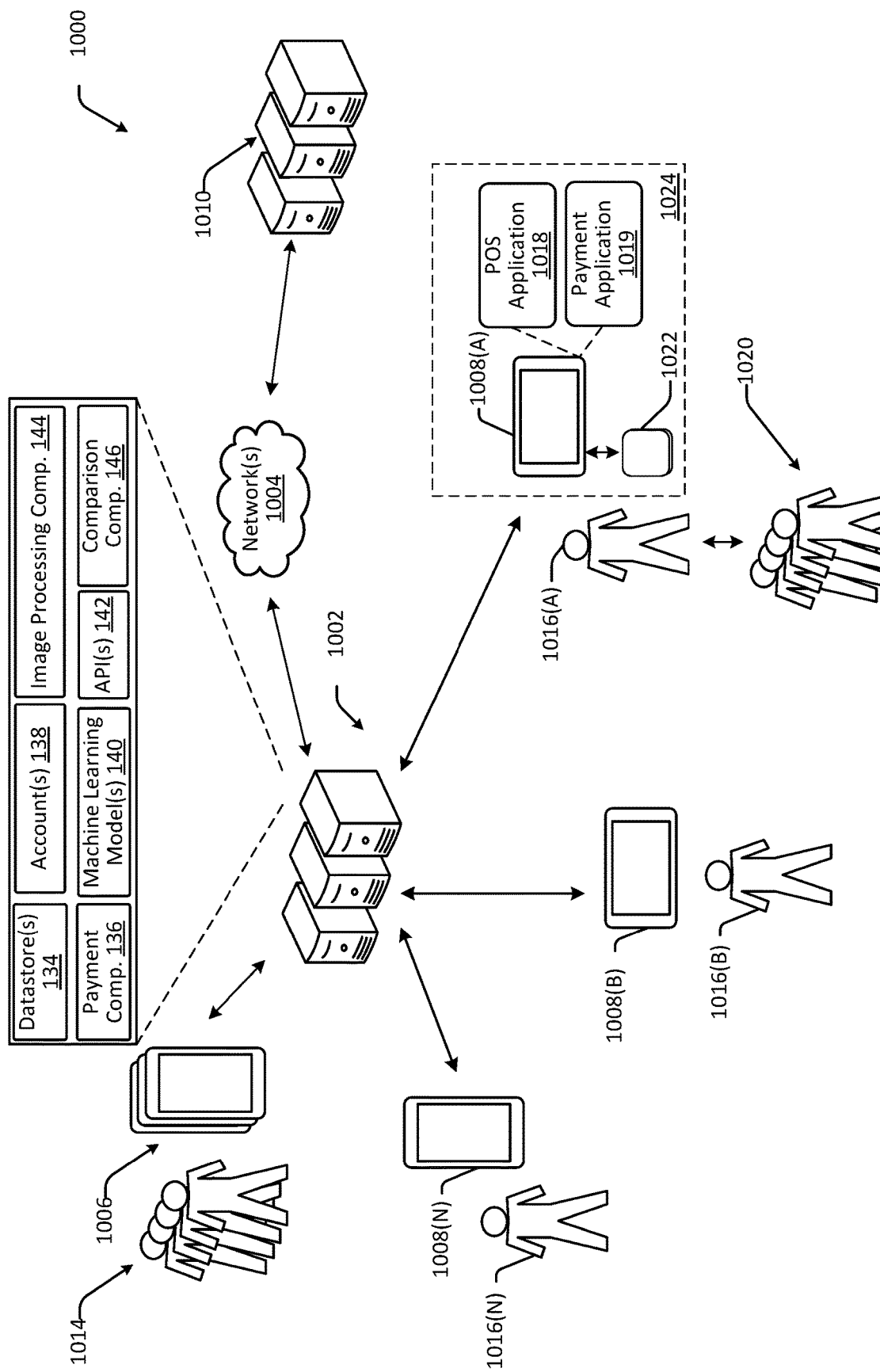
FIG. 10 is an example environment with user devices, merchant devices, a payment service, and/or other systems that may be involved in a transaction, such as by utilizing the payment application as configured herein, according to an embodiment described herein.

FIG. 10 is an example environment with user devices, merchant devices, a payment service, and/or other systems that may be involved in a transaction, such as by utilizing the payment application as configured herein, according to an embodiment described herein. The environment 1000 includes server(s) 1002 that can communicate over a network 1004 with user devices 1006 (which, in some examples can be merchant devices 1008 (individually, 1008(A)-1008(N))) and/or server(s) 1010 associated with third-party service provider(s). The server(s) 1002 can be associated with a service provider that can provide one or more services for the benefit of users 1014, as described below. Actions attributed to the service provider can be performed by the server(s) 1002.

In examples, the server(s) 1002 may be the same as or similar to the payment service 104 from FIG. 1, which may include the same or similar components as described with respect to the payment service 104 of FIG. 1, including the components of the CRM 132 as shown in FIG. 10. Further, the user devices 102 from FIG. 1 may have the same or similar components and perform the same or similar functionality as the user devices 1006 from FIG. 10.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

As described above, in at least one example, the users 1014 can include merchants 1016 (individually, 1016(A)-1016(N)). In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow, barter, etc.). The merchants 1016 can offer items for purchase or other means of acquisition via brick-and-mortar stores, mobile stores (e.g., pop-up shops, food trucks, etc.), online stores, combinations of the foregoing, and so forth. In some examples, at least some of the merchants 1016 can be associated with a same entity but can have different merchant locations and/or can have franchise/franchisee relationships. In additional or alternative examples, the merchants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1008 can have an instance of a POS application 1018 stored thereon. The POS application 1018 can configure the merchant device 1008 as a POS terminal, which enables the merchant 1016(A) to interact with one or more customers 1020. As described above, the users 1014 can include customers, such as the customers 1020 shown as interacting with the merchant 1016(A). For the purpose of this discussion, a "customer" can be any entity that acquires items from merchants. While only two customers 1020 are illustrated in FIG. 10, any number of customers 1020 can interact with the merchants 1016. Further, while FIG. 10 illustrates the customers 1020 interacting with the merchant 1016(A), the customers 1020 can interact with any of the merchants 1016.

In at least one example, interactions between the customers 1020 and the merchants 1016 that involve the exchange of funds (from the customers 1020) for items (from the merchants 1016) can be referred to as "transactions." In at least one example, the POS application 1018 can determine transaction data associated with the POS transactions. Transaction data can include payment information, which can be obtained from a reader device 1022 associated with the merchant device 1008(A), user authentication data, purchase amount information, point-of-purchase information (e.g., item(s) purchased, date of purchase, time of purchase, etc.), etc. The POS application 1018 can send transaction data to the server(s) 1002 such that the server(s) 1002 can track transactions of the customers 1020, merchants 1016, and/or any of the users 1014 over time. Furthermore, the POS application 1018 can present a UI to enable the merchant 1016(A) to interact with the POS application 1018 and/or the service provider via the POS application 1018.

In at least one example, the merchant device 1008(A) can be a special-purpose computing device configured as a POS terminal (via the execution of the POS application 1018). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, BLE, and so on. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1022, and communicate with the server(s) 1002, which can provide, among other services, a payment processing service. The server(s) 1002 associated with the service provider can communicate with server(s) 1010, as described below. In this manner, the POS terminal and reader device 1022 may collectively process transaction(s) between the merchants 1016 and customers 1020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to the customers 1020. In additional or alternative examples, the POS terminal can have a display integrated therein for presenting information to the customers 1020. POS systems, such as the POS system 1024, may be mobile, such that POS terminals and reader devices may process transactions in disparate locations across the world. POS systems can be used for processing card-present transactions and card-not-present (CNP) transactions, as described below.

A card-present transaction is a transaction where both a customer 1020 and his or her payment instrument are physically present at the time of the transaction. Card-present transactions may be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a customer 1020 slides a card, or other payment instrument, having a magnetic strip through a reader device 1022 that captures payment data contained in the magnetic strip. A dip is a card-present transaction where a customer 1020 inserts a payment instrument having an embedded microchip (i.e., chip) into a reader device 1022 first. The dipped payment instrument remains in the payment reader until the reader device 1022 prompts the customer 1020 to remove the card, or other payment instrument. While the payment instrument is in the reader device 1022, the microchip can create a one-time code which is sent from the POS system 1024 to the server(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1020 may tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange information with the reader device 1022. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1024, the server(s) 1002, and/or the server(s) 1010 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1010. As described above, in at least one example, the server(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1010 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1010 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1010 associated therewith), and a payment authorization message is communicated from the issuer to the POS device via a path opposite of that described above, or via an alternate path.

As described above, the server(s) 1010, which can be associated with payment service provider(s), may determine whether the transaction is authorized based on the transaction data, as well as information relating to parties to the transaction (e.g., the customer 1020 and/or the merchant 1016(A)). The server(s) 1010 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1010 to authorize or decline transactions.

Based on the authentication notification that is received by the POS system 1024 from server(s) 1002, the merchant 1016(A) may indicate to the customer 1020 whether the transaction has been approved. In some examples, approval may be indicated at the POS system 1024, for example, at a display of the POS system 1024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1014 can access all of the services of the service provider. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application, web browser, etc.).

The service provider can offer payment processing services for processing payments on behalf of the merchants 1016, as described above. For example, the service provider can provision payment processing software, payment processing hardware and/or payment processing services to merchants 1016, as described above, to enable the merchants 1016 to receive payments from the customers 1020 when conducting POS transactions with the customers 1020. For instance, the service provider can enable the merchants 1016 to receive cash payments, payment card payments, and/or electronic payments from customers 1020 for POS transactions and the service provider can process transactions on behalf of the merchants 1016.

As the service provider processes transactions on behalf of the merchants 1016, the service provider can maintain accounts or balances for the merchants 1016 in one or more ledgers. For example, the service provider can analyze transaction data received for a transaction to determine an amount of funds owed to a merchant 1016(A) for the transaction. In at least one example, such an amount can be a total purchase price less fees charged by the service provider for providing the payment processing services. Based on determining the amount of funds owed to the merchant 1016(A), the service provider can deposit funds into an account of the merchant 1016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1016(A) to a bank account of the merchant 1016(A) that is held at a bank or other financial institution (e.g., associated with the server(s) 1010). Scheduled deposits can occur at a prearranged time after a POS transaction is funded, which can be a business day after the POS transaction occurred, or sooner or later. In some examples, the merchant 1016(A) can access funds prior to a scheduled deposit. For instance, the merchant 1016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider to the bank account of the merchant 1016(A).

In at least one example, the service provider may provide inventory management services. That is, the service provider may provide inventory tracking and reporting. Inventory management services may enable the merchant 1016(A) to access and manage a database storing data associated with a quantity of each item that the merchant 1016(A) has available (i.e., an inventory). Furthermore, in at least one example, the service provider can provide catalog management services to enable the merchant 1016(A) to maintain a catalog, which can be a database storing data associated with items that the merchant 1016(A) has available for acquisition (i.e., catalog management services). In at least one example, the catalog may include a plurality of data items and a data item of the plurality of data items may represent an item that the merchant 1016(A) has available for acquisition. The service provider can offer recommendations related to pricing of the items, placement of items on the catalog, and multi-party fulfilment of the inventory.

In at least one example, the service provider can provide business banking services, which allow the merchant 1016(A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1012 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1014 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider can recommend and/or generate content items to supplement omni-channel presences of the merchants 1016. That is, if a merchant of the merchants 1016 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1014 to set schedules for scheduling appointments and/or users 1014 to schedule appointments.

In some examples, the service provider can provide restaurant management services to enable users 1014 to make and/or manage reservations, to monitor front-of-house and/or back-of-house operations, and so on. In such examples, the merchant device(s) 1008 and/or server(s) 1002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1006.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1014 may be new to the service provider such that the user 1014 that has not registered (e.g., subscribed to receive access to one or more services offered by the service provider) with the service provider. The service provider can offer onboarding services for registering a potential user 1014 with the service provider. In some examples, onboarding can involve presenting various questions, prompts, and the like to a potential user 1014 to obtain information that can be used to generate a profile for the potential user 1014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1014 providing all necessary information, the potential user 1014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1010). That is, the service provider can offer IDV services to verify the identity of users 1014 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1014 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1002) and/or the server(s) 1010 via the network(s) 1004. In some examples, the merchant device(s) 1008 are not capable of connecting with the service provider (e.g., the server(s) 1002) and/or the server(s) 1010, due to a network connectivity issue, for example. In additional or alternative examples, the server(s) 1002 are not capable of communicating with the server(s) 1010 due to network connectivity issue, for example. In such examples, devices may operate in "offline" mode where at least some payment data is stored (e.g., on the merchant device(s) 1008) and/or the server(s) 1002 until connectivity is restored and the payment data can be transmitted to the server(s) 1002 and/or the server(s) 1010 for processing.

In at least one example, the service provider can be associated with a hub, such as an order hub, an inventory hub, a fulfillment hub and so on, which can enable integration with one or more additional service providers (e.g., associated with the additional server(s) 1010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1006 that are in communication with one or more server computing devices 1002 of the service provider. That is, techniques described herein are directed to a specific implementation—or, a practical application—of utilizing a distributed system of user devices 1006 that are in communication with one or more server computing devices 1002 of the service provider to perform a variety of services, as described above. The unconventional configuration of the distributed system described herein enables the server(s) 1002 that are remotely-located from end-users (e.g., users 1014) to intelligently offer services based on aggregated data associated with the end-users, such as the users 1014 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006. Furthermore, such features are changed dynamically based on the profiles of the users involved interacting with the GUIs. As such, techniques described herein are directed to improvements to computing systems.

Figure 11:
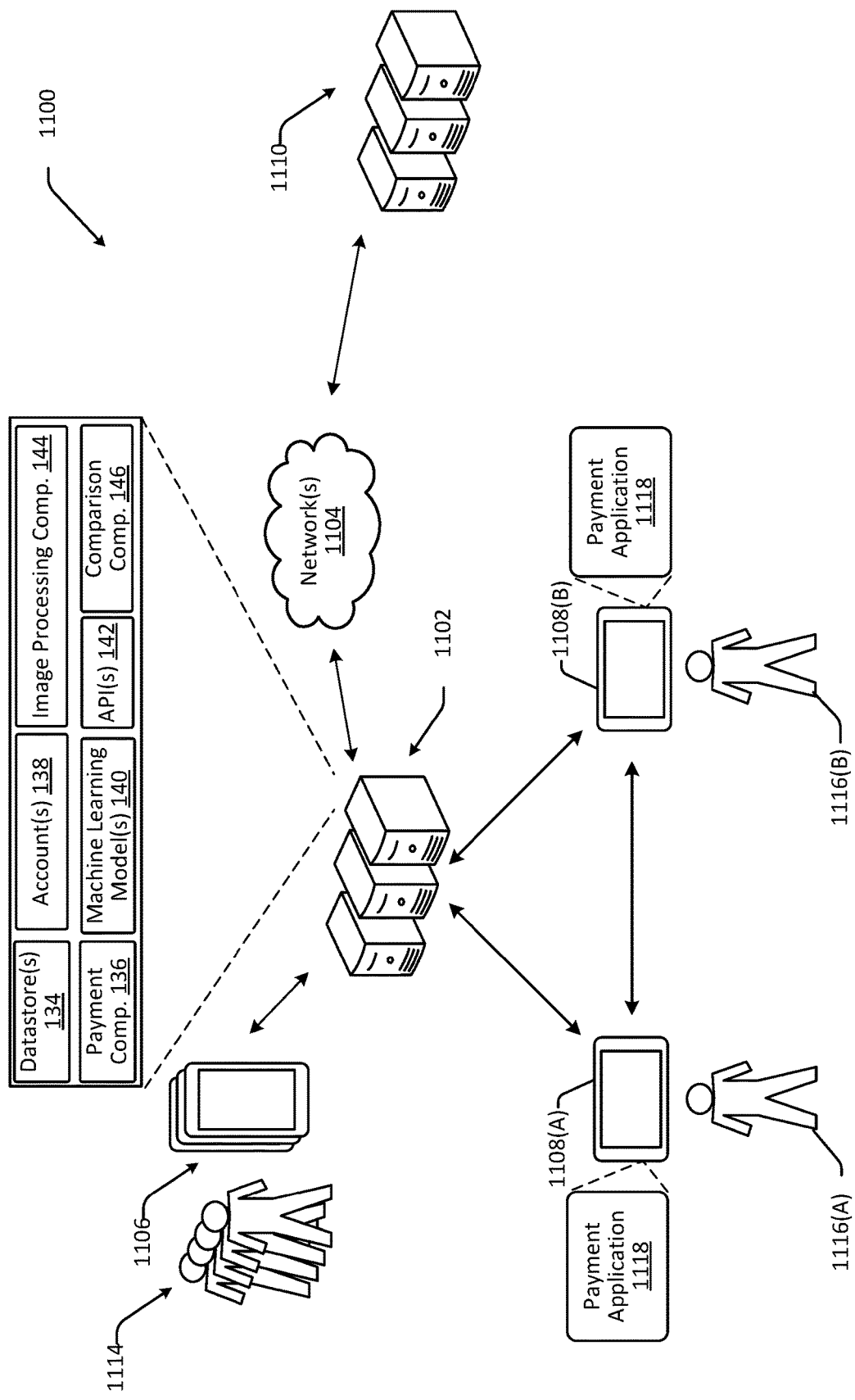
FIG. 11 is an example environment illustrating usage of the payment application, such as described herein, according to an embodiment described herein.

FIG. 11 is an example environment illustrating usage of the payment application, according to an embodiment described herein. The environment 1100 includes server(s) 1102 that can communicate over a network 1104 with user devices 1106 (which, in some examples can be user devices 1108 (individually, 1108(A), 1108(B)) and/or server(s) 1110 associated with third-party service provider(s). The server(s) 1102 can be associated with a service provider that can provide one or more services for the benefit of users 1114, as described below. Actions attributed to the service provider can be performed by the server(s) 1102. In some examples, the service provider referenced in FIG. 10 can be the same or different than the service provider referenced in FIG. 11.

As described herein, the server(s) 1102 may be the same or similar to the payment service 104 described with respect to FIG. 1, which may include the same or similar components as described with respect to the payment service 104 of FIG. 1, including the components of the CRM 132, as shown in FIG. 11. The user devices 1106, 1108 may be the same or similar to the user device 102 described with respect to FIG. 1. The server(s) 1110 associated with third-party service provider(s) may be the same as or similar to the systems associated with payment services or the like, as described herein.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1114. The users 1114 can be referred to as customers, buyers, merchants, sellers, borrowers, employees, employers, payors, payees, couriers and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

In at least one example, the service provider can provide a peer-to-peer payment service that enables peer-to-peer payments between two or more users 1114. Two users, user 1116(A) and user 1116(B) are illustrated in FIG. 11 as "peers" in a peer-to-peer payment. In at least one example, the service provider can communicate with instances of a payment application 1118 (or other access point) installed on devices configured for operation by users 1114. In an example, an instance of the payment application 1118 executing on a first device 1108(A) operated by a payor (e.g., user 1116(A)) can send a request to the service provider to transfer an asset (e.g., fiat currency, non-fiat currency, cryptocurrency, securities, gift cards, and/or related assets) from the payor to a payee (e.g., user 1116(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 12:
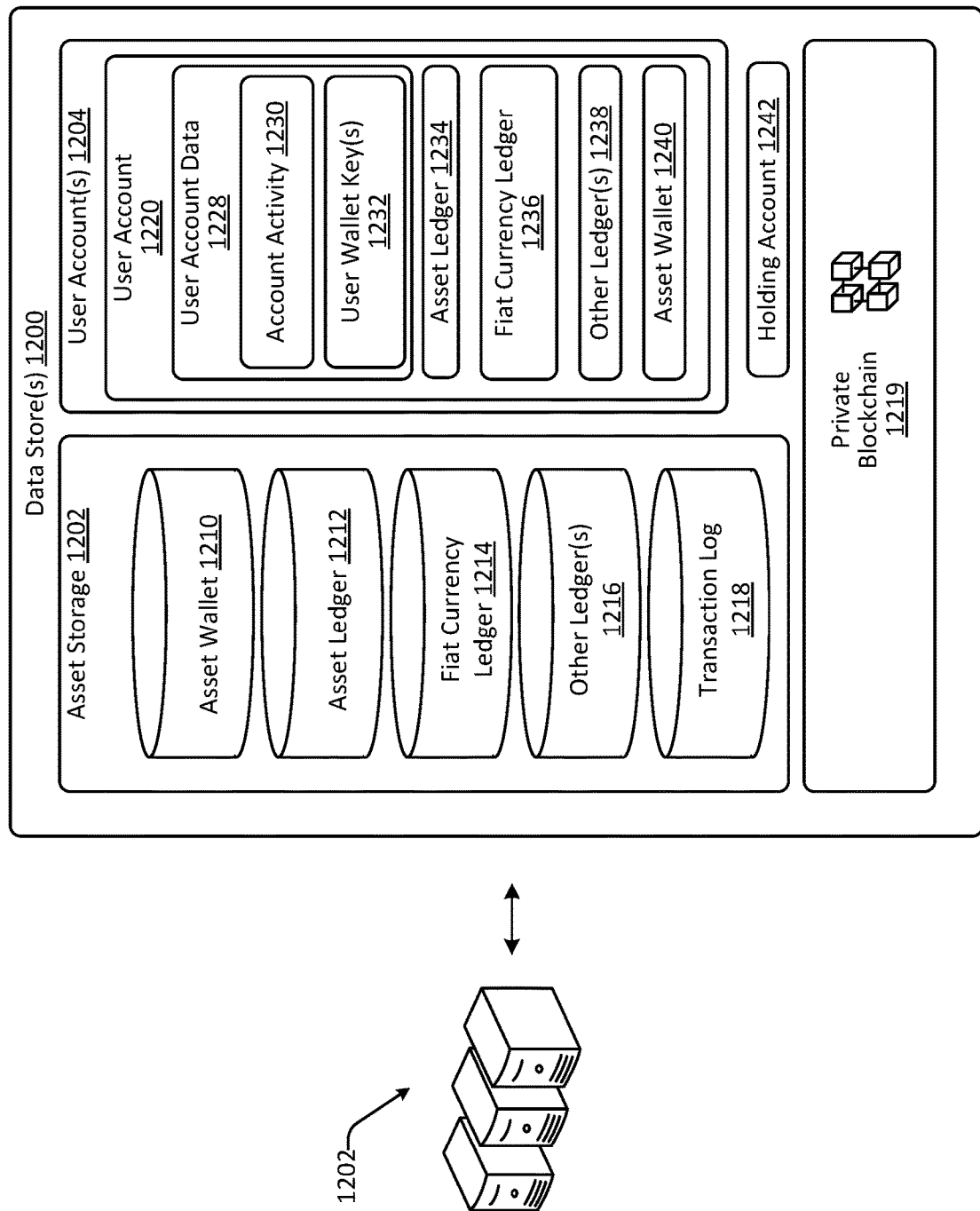
FIG. 12 is an example of datastore(s) that can be associated with servers of the payment service, according to an embodiment described herein.

In some examples, the service provider can utilize a ledger system to track transfers of assets between users 1106. FIG. 12, below, provides additional details associated with such a ledger system. The ledger system can enable users 1106 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1118 executing on user device(s) of payee(s). As an example, the service provider can transfer assets from an account of user 1116(A) to an account of the user 1116(B) and can send a notification to the user device 1108(B) of the user 1116(B) for presentation via a user interface. The notification can indicate that a transfer is in process, a transfer is complete, or the like. In some examples, the service provider can send additional or alternative information to the instances of the payment application 1118 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1102 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1118 executing on the user devices 1106. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 11. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1106 (e.g., mobile device or conventional personal computer (PC)) based on instructions transmitted to and from the server(s) 1102 (which, in such an example can be called a "messaging server"). In some instances, the messaging application can include a payment application with messaging capability that enables users of the payment application to communicate with one another. In such instances, the payment application can be executed on a user device 1106 based on instructions transmitted to and from the server(s) 1102 (e.g., the payment service discussed in this description or another payment service that supports payment transactions). In some examples, the messaging application can be provided by a third-party service provider associated with the server(s) 1110. In examples where the messaging application is a third-party service provider, the server(s) 1110 can be accessible via one or more APIs or other integrations.

As described above, the service provider can facilitate peer-to-peer transactions, which can enable users 1106 to transfer fiat currency, non-fiat currency, cryptocurrency, securities, or other assets, or portions thereof, to other users 1106. In at least one example, individual users can be associated with user accounts. Additional details associated with user accounts and the transfer of assets between users 1106 are described below with reference to FIG. 12.

Furthermore, the service provider of FIG. 11 can enable users 1106 to perform banking transactions via instances of the payment application 1118. For example, users can configure direct deposits or other deposits for adding assets to their various ledgers/balances. Further, users 1106 can configure bill pay, recurring payments, and/or the like using assets associated with their accounts. In addition to sending and/or receiving assets via peer-to-peer transactions, users 1106 buy and/or sell assets via asset networks such as cryptocurrency networks, securities networks, and/or the like.

FIG. 12 is an example of data store(s) that can be associated with servers of the payment service, according to an embodiment described herein. In at least one example, the data store(s) 1200 can store assets in an asset storage 1202, as well as data in user account(s) 1204, merchant account(s) 1206, and/or customer account(s) 1208. In at least one example, the asset storage 1202 can be used to store assets managed by the service provider of FIG. 11. In at least one example, the asset storage 1202 can be used to record whether individual of the assets are registered to users. For example, the asset storage 1202 can include an asset wallet 1210 for storing records of assets owned by the service provider of FIG. 11, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1110 can be associated therewith. In some examples, the asset wallet 1210 can communication with the asset network via one or more components associated with the server(s) 1102.

The asset wallet 1210 can be associated with one or more addresses and can vary addresses used to acquire assets (e.g., from the asset network(s)) so that its holdings are represented under a variety of addresses on the asset network. In examples where the service provider of FIG. 11 has its own holdings of cryptocurrency (e.g., in the asset wallet 1210), a user can acquire cryptocurrency directly from the service provider of FIG. 11. In some examples, the service provider of FIG. 11 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1202 may contain ledgers that store records of assignments of assets to users 1106. Specifically, the asset storage 1202 may include asset ledger 1210, fiat currency ledger 1214, and other ledger(s) 1216, which can be used to record transfers of assets between users 1106 of the service provider and/or one or more third-parties (e.g., merchant network(s), payment card network(s), ACH network(s), equities network(s), the asset network, securities networks, etc.). In doing so, the asset storage 1202 can maintain a running balance of assets managed by the service provider of FIG. 11. The ledger(s) of the asset storage 1202 can further indicate some of the running balance for each of the ledger(s) stored in the asset storage 1202 is assigned or registered to one or more user account(s) 1204.

In at least one example, the asset storage 1202 can include transaction logs 1218, which can include records of past transactions involving the service provider of FIG. 11. In at least one example, transaction data, as described herein, can be stored in association with the transaction logs 1218.

In some examples, the data store(s) 1200 can store a private blockchain 1219. A private blockchain 1219 can function to record sender addresses, recipient addresses, public keys, values of cryptocurrency transferred, and/or can be used to verify ownership of cryptocurrency tokens to be transferred. In some examples, the service provider of FIG. 11 can record transactions taking place within the service provider of FIG. 11 involving cryptocurrency until the number of transactions has exceeded a determined limit (e.g., number of transactions, storage space allocation, etc.). Based at least in part on determining that the limit has been reached, the service provider of FIG. 11 can publish the transactions in the private blockchain 1219 to a public blockchain (e.g., associated with the asset network), where miners can verify the transactions and record the transactions to blocks on the public blockchain. In at least one example, the service provider of FIG. 11 can participate as miner(s) at least for its transactions to be posted to the public blockchain.

In at least one example, the data store(s) 1200 can store and/or manage accounts, such as user account(s) 1204, merchant account(s) 1206, and/or customer account(s) 1208. In at least one example, the user account(s) 1204 may store records of user accounts associated with the users 1106. In at least one example, the user account(s) 1204 can include a user account 1220, which can be associated with a user (of the users 1106). Other user accounts of the user account(s) 1204 can be similarly structured to the user account 1220, according to some examples. In other examples, other user accounts may include more or less data and/or account information than that provided by the user account 1 220. In at least one example, the user account 1 2 20 can include user account data 1228, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1228 can include account activity 1 2 30 and user wallet key(s) 1 2 32. The account activity 1 2 30 may include a transaction log for recording transactions associated with the user account 12 20. In some examples, the user wallet key(s) 1232 can include a public-private key-pair and a respective address associated with the asset network or other asset networks. In some examples, the user wallet key(s) 1 2 32 may include one or more key pairs, which can be uni3ue to the asset network or other asset networks.

In addition to the user account data 1228, the user account 1220 can include ledger(s) for account(s) managed by the service provider of FIG. 11, for the user. For example, the user account 1220 may include an asset ledger 1234, a fiat currency ledger 1 2 36, and/or one or more other ledgers 1238. The ledger(s) can indicate that a corresponding user utilizes the service provider of FIG. 11 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 11.

In some examples, the asset ledger 1234 can store a balance for each of one or more cryptocurrencies (e.g., Bitcoin, Ethereum, Litecoin, etc.) registered to the user account 12 20. In at least one example, the asset ledger 1234 can further record transactions of cryptocurrency assets associated with the user account 1220. For example, the user account 1220 can receive cryptocurrency from the asset network using the user wallet key(s) 1 2 32. In some examples, the user wallet key(s) 1232 may be generated for the user upon request. User wallet key(s) 1232 can be requested by the user in order to send, exchange, or otherwise control the balance of cryptocurrency held by the service provider of FIG. 11 (e.g., in the asset wallet 1210) and registered to the user. In some examples, the user wallet key(s) 1 2 32 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 11 and the value is credited as a balance in asset ledger 1234), by purchasing currency in the form associated with the account using currency in a different form (e.g., buying a value of cryptocurrency from the service provider of FIG. 11 using a value of fiat currency reflected in fiat currency ledger 1214, and crediting the value of cryptocurrency in asset ledger 1234), or by conducting a transaction with another user (customer or merchant) of the service provider of FIG. 11 wherein the account receives incoming currency (which can be in the form associated with the account or a different form, in which the incoming currency may be converted to the form associated with the account). In some examples, the user account data 1228 can include preferences for maintaining balances of individual of the ledgers. For example, the service provider of FIG. 11 can automatically debit the fiat currency ledger 1236 to increase the asset ledger 1234, or another account associated with the user whenever the cryptocurrency balance (e.g., of the asset ledger 1234) falls below a stated level (e.g., a threshold). Conversely, in some embodiments, the service provider of FIG. 11 can automatically credit the fiat currency ledger 1236 to decrease the asset ledger 1234 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 11 (i.e., an external account). In at least one example, the user can transfer all or a portion of a balance of the cryptocurrency stored in the third-party cryptocurrency wallet to the service provider of FIG. 11. Such a transaction can require the user to transfer an amount of the cryptocurrency in a message signed by user's private key to an address provided by the service provider of FIG. 11. In at least one example, the transaction can be sent to miners to bundle the transaction into a block of transactions and to verify the authenticity of the transactions in the block. Once a miner has verified the block, the block is written to a public, distributed blockchain where the service provider of FIG. 11 can then verify that the transaction has been confirmed and can credit the user's asset ledger 1234 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 11. As described above, in some examples, the service provider of FIG. 11 can acquire cryptocurrency from a third-party source (e.g., associated with the third-party server(s)). In such examples, the asset wallet 1210 can be associated with different addresses and can vary addresses used to acquire cryptocurrency so that its holdings are represented under a variety of addresses on a blockchain. When the service provider of FIG. 11 has their own holdings of cryptocurrency, users can acquire cryptocurrency directly from the service provider of FIG. 11. In some examples, the service provider of FIG. 11 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 11 has its own cryptocurrency assets, cryptocurrency transferred in a transaction (e.g., data with address provided for receipt of transaction and a balance of cryptocurrency transferred in the transaction) can be stored in the asset wallet 1210. In at least one example, the service provider of FIG. 11 can credit the asset ledger 1234 of the user. Additionally, while the service provider of FIG. 11 recognizes that the user retains the value of the transferred cryptocurrency through crediting the asset ledger 1234, any person that inspects the blockchain will see the cryptocurrency as having been transferred to the service provider of FIG. 11. In some examples, the asset wallet 1210 can be associated with many different addresses. In such examples, any person that inspects the blockchain may not easily associate all cryptocurrency stored in asset wallet 1210 as belonging to the same entity. It is this presence of a private ledger that is used for real-time transactions and maintained by the service provider of FIG. 11, combined with updates to the public ledger at other times, that allows for extremely fast transactions using cryptocurrency to be achieved. In some examples, the "private ledger" can refer to the asset ledger 1210, which in some examples, can utilize the private blockchain 1219, as described herein. The "public ledger" can correspond to a public blockchain associated with the asset network.

In at least one example, a user's asset ledger 1234, fiat currency ledger 1236, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1234. In some examples, a user can receive fiat currency or another currency in the form of payment for a transaction with another user. In at least one example, at least a portion of such funds can be converted into cryptocurrency by the service provider of FIG. 11 and used to fund the asset ledger 1234 of the user.

As addressed above, in some examples, users can also have other accounts maintained by the service provider of FIG. 11. For example, a user can also have an account in U.S. dollars, which can be tracked, for example, via the fiat currency ledger 1236. Such an account can be funded by transferring money from a bank account at a third-party bank to an account maintained by the service provider of FIG. 11 as is conventionally known. In some examples, a user can receive fiat currency in the form of payment for a transaction with another user. In such examples, at least a portion of such funds can be used to fund the fiat currency ledger 1236.

In some examples, a user can have one or more internal payment cards registered with the service provider of FIG. 11. Internal payment cards can be linked to one or more of the accounts associated with the user account 1220. In some embodiments, options with respect to internal payment cards can be adjusted and managed using an application (e.g., the payment application 1118).

In at least one example, as described above, each ledger can correspond to an account of the user that is managed by the service provider of FIG. 11. In at least one example, individual of the accounts can be associated with a wallet or a stored balance for use in payment transactions, peer-to-peer transactions, payroll payments, etc.

In at least one example, the user account 1220 can be associated with an asset wallet 1240. The asset wallet 1240 of the user can be associated with account information that can be stored in the user account data 1228 and, in some examples, can be associated with the user wallet key(s) 1232. In at least one example, the asset wallet 1240 can store data indicating an address provided for receipt of a cryptocurrency transaction. In at least one example, the balance of the asset wallet 1240 can be based at least in part on a balance of the asset ledger 1234. In at least one example, funds availed via the asset wallet 1240 can be stored in the asset wallet 1240 or the asset wallet 1210. Funds availed via the asset wallet 1210 can be tracked via the asset ledger 1234. The asset wallet 1240, however, can be associated with additional cryptocurrency funds.

In at least one example, when the service provider of FIG. 11 includes a private blockchain 1219 for recording and validating cryptocurrency transactions, the asset wallet 1240 can be used instead of, or in addition to, the asset ledger 1234. For example, at least one example, a merchant can provide the address of the asset wallet 1240 for receiving payments. In an example where a customer is paying in cryptocurrency and the customer has their own cryptocurrency wallet account associated with the service provider of FIG. 11, the customer can send a message signed by its private key including its wallet address (i.e., of the customer) and identifying the cryptocurrency and value to be transferred to the merchant's asset wallet 1240. The service provider of FIG. 11 can complete the transaction by reducing the cryptocurrency balance in the customer's cryptocurrency wallet and increasing the cryptocurrency balance in the merchant's asset wallet 1240. In addition to recording the transaction in the respective cryptocurrency wallets, the transaction can be recorded in the private blockchain 1219 and the transaction can be confirmed. A user can perform a similar transaction with cryptocurrency in a peer-to-peer transaction as described above. In at least one example, the cryptocurrency wallet account 1230 can be funded by a balance transfer from a third-party cryptocurrency wallet, as described above. Such a transaction can re3uire a user to transfer an amount of cryptocurrency in a message signed by the user's private key to an address of the cryptocurrency wallet account 1230. The transferred amount of cryptocurrency can then be within the cryptocurrency wallet account 1230 for use in later transactions.

While the asset ledger 1234 and/or asset wallet 1240 are each described above with reference to cryptocurrency, the asset ledger 1234 and/or asset wallet 1240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 11 is an aspect of the technology disclosed that enables technical advantages of increased processing speed and improved security.

Figure 13:
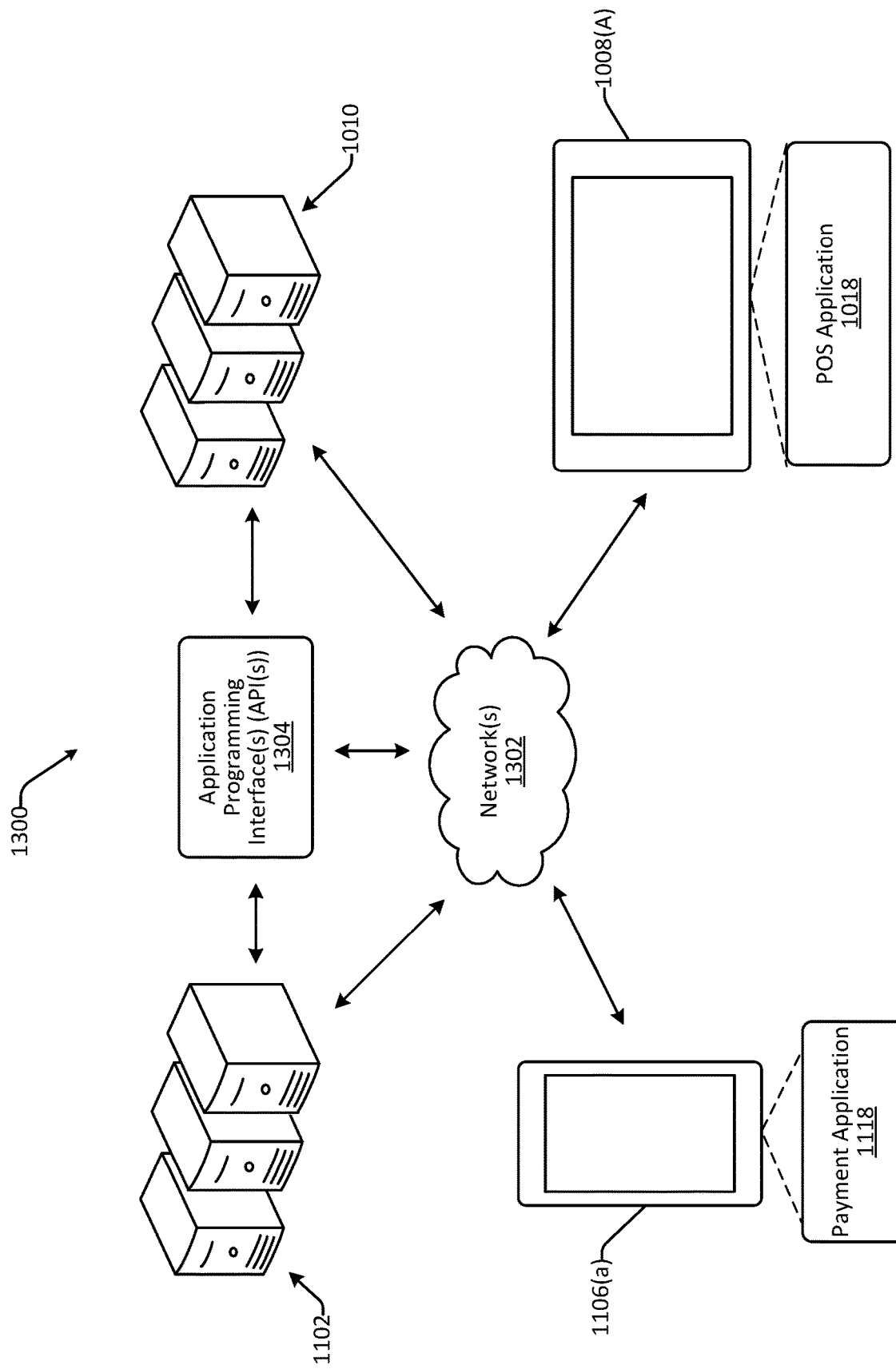
FIG. 13 is an example environment wherein the payment service environment of FIG. 10 and the environment from FIG. 11 can be integrated to enable payments at the point-of-sale using assets associated with user accounts in the peer-to-peer environment of FIG. 11, according to an embodiment described herein.

FIG. 13 is an example environment 1300 wherein the environment 1000 and the environment 1100 can be integrated to enable payments at the point-of-sale using assets associated with user accounts in the peer-to-peer environment of FIG. 11, according to an embodiment described herein. As illustrated, each of the components can communicate with one another via one or more networks 1302. In some examples, one or more APIs 1304 or other functional components can be used to facilitate such communication. For example, the APIs 1304 can be used to facilitate communication with payment service server(s) 1102 and server(s) 1110 associated with third-party service provider(s).

In at least one example, the example environment 1300 can enable contactless payments, via integration of peer-to-peer payment, or other payment making, platform(s) and payment processing platform(s), are described herein. For the purpose of FIG. 13, the environment 1000 can refer to a payment processing platform and the environment 1100 can refer to a peer-to-peer payment, or payment making, platform. In an example, such an integration can enable a customer to participate in a transaction via their own computing device instead of interacting with a merchant device of a merchant, such as the merchant device 1008(A). In such an example, the POS application 1018, associated with a payment processing platform and executable by the merchant device 1008(A) of the merchant, can present a Quick Response (QR) code, or other code that can be used to identify a transaction (e.g., a transaction code), in association with a transaction between the customer and the merchant. The QR code, or other transaction code, can be provided to the POS application 1018 via an API associated with the peer-to-peer payment platform. In an example, the customer can utilize their own computing device, such as the user device 1108(A), to capture the QR code, or the other transaction code, and to provide an indication of the captured QR code, or other transaction code, to server(s) 1002 and/or server(s) 1102.

Based at least in part on the integration of the peer-to-peer payment platform and the payment processing platform (e.g., via the API), the server(s) 1002 and/or 1102 associated with each can exchange communications with each other—and with a payment application 1118 associated with the peer-to-peer payment platform and/or the POS application 1018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The customer can use a camera associated with the user device 1108(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1108(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1108(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1118 of a user device 1108(A) of a customer to enable the customer to participate in a transaction via their own computing device. For instance, in a. "scan to pay" example as described above, based at least in part on capturing the QR code, or other transaction code, via the user device 1108(A), the payment processing platform can provide transaction data to the peer-to-peer payment platform for presentation via the payment application 1118 on the user device 1108(A) In some examples, the customer can watch items being added to their cart (e.g., via a user interface presented via the payment application). As an item is added to a virtual cart by the merchant—via the POS application 1018 on the merchant device 1008(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1118 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1108(A) during or after payment of the transaction.

In some examples, based at least in part on capturing the QR code, or other transaction code, the payment processing platform can provide transaction data to the peer-to-peer payment platform for presentation via the payment application 1118 on the computing device of the customer, such as the user device 1108(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during call building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1118 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 14:
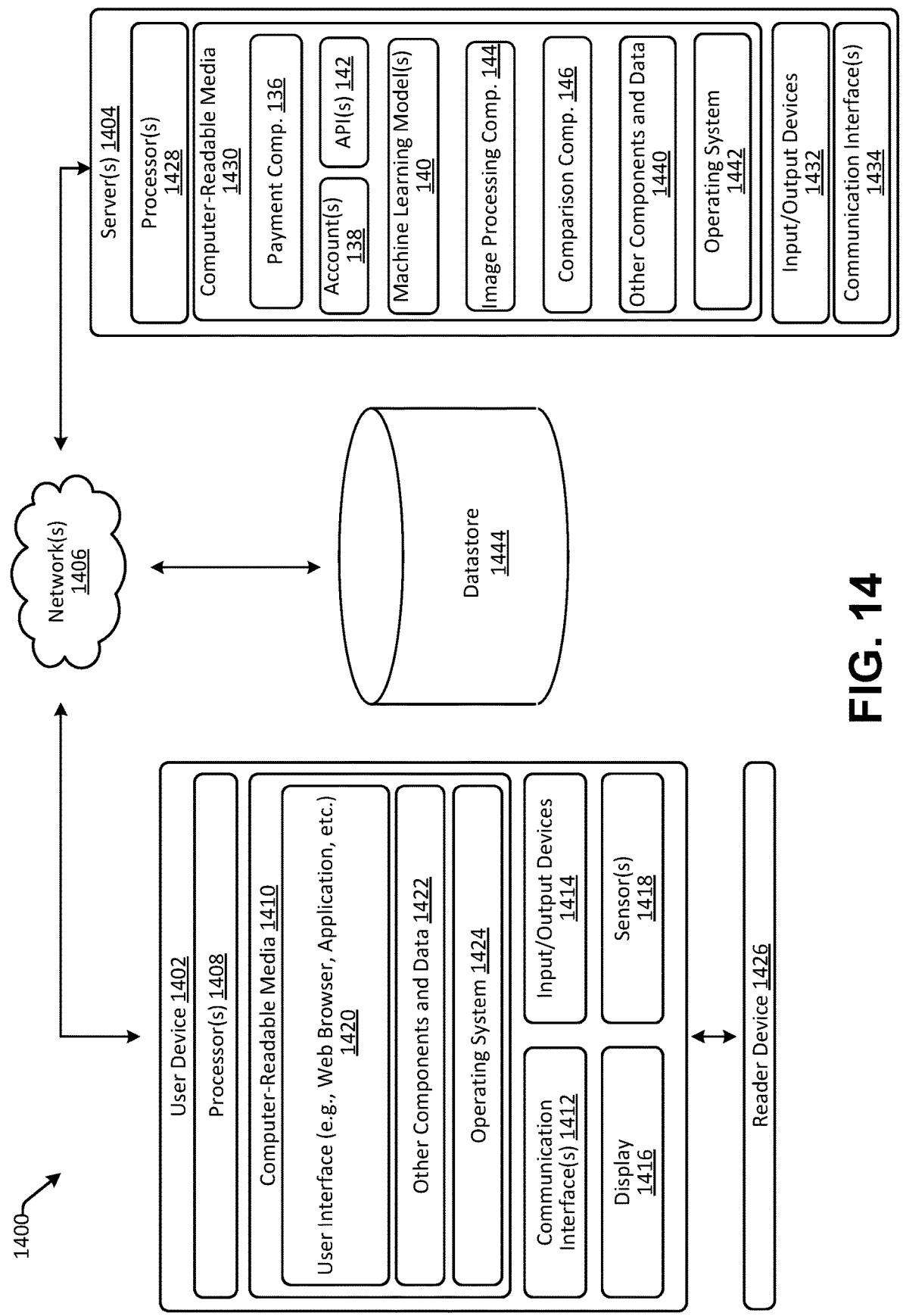
FIG. 14 is an illustrative block diagram illustrating a system for performing techniques described herein, according to an embodiment described herein.

FIG. 14 is an illustrative block diagram illustrating a system for performing techniques described herein, according to an embodiment described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 14.

The user device 1402 may be the same or similar to the user device 102 as described with respect to FIG. 1. Additionally, the server(s) 1404 may be the same or similar to the payment service 104 described with respect to FIG. 1.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider associated with the server(s) 1404, or which can be an otherwise dedicated application. In some examples, the user interface 1420 can be configured to display options for withdrawing funds to make donations. The user interface 1420 may also be configured to surface information about donations. It should be understood that the user interface 1420 can be configured to display, facilitate, or otherwise perform any of the interactions described herein with respect to transactions or other operations as described herein. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices. The I/O devices can include speakers, a microphone, a camera, and various user controls (e.g., buttons, a joystick, a keyboard, a keypad, etc.), a haptic output device, and so forth. The I/O devices can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtually reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1424, described above, to provide one or more services. That is, in some examples, the service provider 1424 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1414 and/or for sending users 1414 notifications regarding available appointments with merchant(s) located proximate to the users 1414. In at least one example, location can be used for taking payments from nearby customers when they leave a geofence, or location can be used to initiate an action responsive to users 1414 enter a brick-and-mortar store of a merchant. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1426 may also include a biometric sensor to receive and process biometric characteristics and process them as payment instruments, given that such biometric characteristics are registered with the payment service 104 and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more components and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one component for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units, and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider and/or payment processing service. Functional components stored in the computer-readable media 1430 can optionally include the components described with respect to the CRM 132 from FIG. 1, as shown in FIG. 14.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other components and data 1440 can include programs, drivers, etc., and the data used or generated by the functional components. Further, the server(s) 1404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406.

In at least one example, the datastore 1444 can store user profiles, which can include merchant profiles, customer profiles, and so on. In some examples, the datastore(s) 1444 can store user profiles of customers, merchants, the payment service, etc., as described herein. In some examples, such user profiles can be associated with one or more user accounts.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1444 can store additional or alternative types of data as described herein.

Example Clauses

1. A computer-implemented method comprising: receiving, by one or more computing devices, first data representing an instruction to obtain images of a payment instrument in two or more perspectives, wherein the two or more perspectives are determined based at least in part on at least one of a type of the payment instrument or a risk metric associated with a transaction; generating, by the one or more computing devices and based at least in part on the instruction, second data representing images of the payment instrument taken by a camera in the two or more perspectives; generating, by the one or more computing devices and utilizing the second data, a three-dimensional model of the payment instrument, the three-dimensional model indicating information present on the payment instrument; determining, by the one or more computing devices, that the information differs from third data associated with the payment instrument as stored by a payment server; and generating fourth data indicating a likelihood of a fraudulent event based at least in part on the information differing from the third data.

2. The computer-implemented method of clause 1, wherein the images are captured utilizing a digital scan of the payment instrument.

3. The computer-implemented method of clauses 1 and/or 2, wherein the payment instrument includes a near-field communication object, and the second data represents images of the near-field communication object.

4. The computer-implemented method of any of clauses 1, 2, and/or 3, wherein the first data is configured to cause the camera to enable and an application associated with the camera to be displayed on a foreground of a screen.

5. The computer-implemented method of any of clauses 1, 2, 3, and/or 4, wherein the first data is configured to cause a template to be displayed on a screen, the template indicating how the payment instrument is to be moved to obtain the images of the payment instrument in the two or more perspectives.

6. The computer-implemented method of any of clauses 1, 2, 3, 4, and/or 5, further comprising causing output of a request to modify the information as determined from the three-dimensional model by user input.

7. The computer-implemented method of any of clauses 1, 2, 3, 4, 5, and/or 6, wherein determining that the information differs from the third data is based at least in part on analysis of the three-dimensional model utilizing optical character recognition processing and computer vision processing.

8. A system comprising: one or more processors; and non-transitory computer-readable media storing instructions that, when executed by the one or more processors, cause the one or more processors to perform operations comprising: receiving first data representing an instruction to obtain images of a payment instrument; generating, based at least in part on the instruction, second data representing images of the payment instrument taken by a camera; performing a comparison of (1) information obtained from the second data and (2) third data associated with the payment instrument as previously stored; and generating fourth data indicating a likelihood of a fraudulent event based at least in part on the comparison.

9. The system of clause 8, wherein: the instruction is to obtain images of the payment instrument in two or more perspectives; and the two or more perspectives are determined based at least in part on a type of the payment instrument.

10. The system of clauses 8 and/or 9, wherein: the instruction is to obtain images of the payment instrument in two or more perspectives; and the two or more perspectives are determined based at least in part on a risk metric associated with a transaction.

11. The system of any of clauses 8, 9, and/or 10, the operations further comprising: receiving an indication that the payment instrument is requested to be used in association with a transaction; determining a risk metric associated with the transaction, wherein receiving the first data is based at least in part on the risk metric satisfying a threshold risk metric; and receiving, based at least in part on the risk metric satisfying the threshold risk metric, the third data associated with the payment instrument as previously stored from a payment server.

12. The system of any of clauses 8, 9, 10, and/or 11, the operations further comprising: determining a first perspective of a first image of the payment instrument to be obtained; determining a second perspective of a second image of the payment instrument to be obtained; determining when a field of view of the camera depicts the payment instrument pursuant to the first perspective; causing the camera to generate first image data when the field of view of the camera depicts the payment instrument pursuant to the first perspective; determining when the field of view of the camera transitions to depicting the payment instrument pursuant to the second perspective; causing the camera to generate second image data when the field of view of the camera transitions to depicting the payment instrument pursuant to the second perspective; and wherein the second data comprises the first image data and the second image data.

13. The system of any of clauses 8, 9, 10, 11, and/or 12, the operations further comprising: generating, utilizing the second data, a three-dimensional model of the payment instrument; and wherein the information is at least partially obtained from the three-dimensional model.

14. The system of any of clauses 8, 9, 10, 11, 12, and/or 13, the operations further comprising: performing optical character recognition on the second data such that text data is identified from the payment instrument; performing computer vision processing on the second data such that object attributes are identified from the payment instrument; and determining the information from the text data and from the object attributes.

15. A method, comprising: receiving first data representing an instruction to obtain images of a payment instrument; generating, based at least in part on the instruction, second data representing images of the payment instrument taken by a camera; performing a comparison of (1) information obtained from the second data and (2) third data associated with the payment instrument as previously stored; and generating fourth data indicating a likelihood of a fraudulent event based at least in part on the comparison.

16. The method of clause 15, further comprising: receiving the third data from a payment server, the third data including previously-captured images of the payment instrument; and wherein the comparison includes identifying similarities between the images from the second data and the previously-captured images from the third data.

17. The method of clauses 15 and/or 16, further comprising: determining, from the second data, a portion of the second data that corresponds to a signature field from the payment instrument, wherein the information includes the portion of the second data that corresponds to the signature field; receiving the third data from a payment server, the third data including a representation of a signature associated with the payment instrument; and wherein: the comparison includes comparing the portion of the second data that corresponds to the signature field to the third data to determine similarities between a signature as found in the signature field and the signature from the third data; and the fourth data is based at least in part on the similarities between the signature as found in the signature field and the signature from the third data.

18. The method of any of clauses 15, 16, and/or 17, further comprising: determining, based at least in part on the second data, attributes of the payment instrument as captured by the camera; receiving the third data from a payment server, the third data including reference attributes of the payment instrument as stored by the payment server; and wherein: the comparison includes comparing types of the attributes to types of the reference attributes; and the fourth data is based at least in part on similarities determined as between the types of the attributes and the types of the reference attributes.

19. The method of any of clauses 15, 16, 17, and/or 18, further comprising: determining, based at least in part on the second data, attributes of the payment instrument as captured by the camera; receiving the third data from a payment server, the third data including reference attributes of the payment instrument as stored by the payment server; and wherein: the comparison includes comparing the attributes to the reference attributes; and the fourth data is based at least in part on similarities between the attributes and the reference attributes.

20. The method of any of clauses 15, 16, 17, 18, and/or 19, further comprising: applying a trained machine learning model to the information and the third data to perform the comparison; and wherein the fourth data is generated as output from the trained machine learning model.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 6-9 for convenience and ease of understanding. However, the methods illustrated are not limited to being performed using components described herein, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A computer-implemented method comprising:
receiving, by one or more computing devices, first data representing an instruction to obtain images of a payment instrument in two or more perspectives, wherein the two or more perspectives are determined based at least in part on at least one of a type of the payment instrument or a risk metric associated with a user account and wherein the first data is configured to cause a template to be displayed on a screen of an individual computing device of the one or more computing devices, the template indicating how the payment instrument is to be moved to obtain the images of the payment instrument in the two or more perspectives;
generating, by the one or more computing devices and based at least in part on the instruction, second data representing images of the payment instrument taken by a camera in the two or more perspectives, wherein the first data is configured to cause an application associated with the camera to be displayed on a foreground of the screen;
generating, by the one or more computing devices and utilizing the second data, a three-dimensional model of the payment instrument, the three-dimensional model indicating information present on the payment instrument and physical attributes of the payment instrument,
wherein the information present on the payment instrument includes one or more selected from a Quick Response (QR) code, a barcode, a photograph of a cardholder, a symbol associated with tap-to-pay functionality, a signature of a cardholder, design or artwork, and combinations thereof, and
wherein the physical attributes include at least physical dimensions of the payment instrument selected from a group of a thickness of the payment instrument, a degree of embossing, a degree of concavity of text on the payment instrument, and combinations thereof;
determining, by the one or more computing devices, that the information and the physical attributes differ from third data associated with the payment instrument as stored by a payment server; and
generating fourth data indicating a likelihood of a fraudulent event based at least in part on the information and the physical attributes differing from the third data.

2. The computer-implemented method of claim 1, wherein the images are captured utilizing a digital scan of the payment instrument.

3. The computer-implemented method of claim 1, wherein the payment instrument includes a near-field communication object, and the second data represents images of the near-field communication object.

4. The computer-implemented method of claim 1, further comprising determining the risk metric by:
retrieving stored data known about the user account associated with the payment instrument; and
outputting, with a machine-learning model and based on the stored data, the risk metric.

5. The computer-implemented method of claim 1, further comprising causing output of a request to modify the information as determined from the three-dimensional model by user input.

6. The computer-implemented method of claim 1, wherein determining that the information differs from the third data is based at least in part on analysis of the three-dimensional model utilizing optical character recognition processing and computer vision processing.

7. A system comprising:
one or more processors; and
non-transitory computer-readable media storing instructions that, when executed by the one or more processors, cause the one or more processors to perform operations comprising:
receiving first data representing an instruction to obtain images of a payment instrument in two or more perspectives, wherein the two or more perspectives are determined based at least in part on at least one of a type of the payment instrument or a risk metric associated with a user account and wherein the first data is configured to cause a template to be displayed on a screen of an individual computing device, the template indicating how the payment instrument is to be moved to obtain the images of the payment instrument in the two or more perspectives;
generating, based at least in part on the instruction, second data representing images of the payment instrument taken by a camera, wherein the first data is configured to cause an application associated with the camera to be displayed on a foreground of the screen;
generating, utilizing the second data, a three-dimensional model of the payment instrument, the three-dimensional model indicating information present on the payment instrument and physical attributes of the payment instrument,
wherein the information present on the payment instrument includes one or more selected from a Quick Response (QR) code, a barcode, a photograph of a cardholder, a symbol associated with tap-to-pay functionality, a signature of a cardholder, design or artwork, and combinations thereof, and
wherein the physical attributes include at least physical dimensions of the payment instrument selected from a group of a thickness of the payment instrument, a degree of embossing, a degree of concavity of text on the payment instrument, and combinations thereof;
determining that the information and the physical attributes differ from third data associated with the payment instrument as stored by a payment server; and
generating fourth data indicating a likelihood of a fraudulent event based at least in part on the information and the physical attributes differing from the third data.

8. The system of claim 7, wherein
the images are captured utilizing a digital scan of the payment instrument.

9. The system of claim 7, wherein the operations further comprise determining the risk metric by:
retrieving stored data known about the user account; and
outputting, with a machine-learning model and based on the stored data, the risk metric.

10. The system of claim 7, the operations further comprising:
receiving an indication that the payment instrument is requested to be used in association with a transaction;
determining a risk metric associated with the transaction, wherein receiving the first data is based at least in part on the risk metric associated with the transaction satisfying a threshold risk metric; and
receiving, based at least in part on the risk metric satisfying the threshold risk metric, the third data associated with the payment instrument as previously stored from the payment server.

11. The system of claim 7, the operations further comprising:
determining a first perspective of a first image of the payment instrument to be obtained;
determining a second perspective of a second image of the payment instrument to be obtained;
determining when a field of view of the camera depicts the payment instrument pursuant to the first perspective;
causing the camera to generate first image data when the field of view of the camera depicts the payment instrument pursuant to the first perspective;
determining when the field of view of the camera transitions to depicting the payment instrument pursuant to the second perspective;
causing the camera to generate second image data when the field of view of the camera transitions to depicting the payment instrument pursuant to the second perspective; and
wherein the second data comprises the first image data and the second image data.

12. The system of claim 7, wherein the payment instrument includes a near-field communication object, and the second data represents images of the near-field communication object.

13. The system of claim 7, the operations further comprising:
performing optical character recognition on the second data such that text data is identified from the payment instrument;
performing computer vision processing on the second data such that object attributes are identified from the payment instrument; and
determining the information from the text data and from the object attributes.

14. A non-transitory computer-readable medium with instructions stored thereon that, when executed by one or more computers, cause the one or more computers to perform operations, the operations comprising:
receiving, by the one or more computers, first data representing an instruction to obtain images of a payment instrument in two or more perspectives, wherein the two or more perspectives are determined based at least in part on at least one of a type of the payment instrument or a risk metric associated with a user account and wherein the first data is configured to cause a template to be displayed on a screen of an individual computing device of the one or more computing devices, the template indicating how the payment instrument is to be moved to obtain the images of the payment instrument in the two or more perspectives;
generating, by the one or more computers and based at least in part on the instruction, second data representing images of the payment instrument taken by a camera in the two or more perspectives, wherein the first data is configured to cause an application associated with the camera to be displayed on a foreground of the screen;
generating, by the one or more computers and utilizing the second data, a three-dimensional model of the payment instrument, the three-dimensional model indicating information present on the payment instrument and physical attributes of the payment instrument, wherein the information present on the payment instrument includes one or more selected from a Quick Response (QR) code, a barcode, a photograph of a cardholder, a symbol associated with tap-to-pay functionality, a signature of a cardholder, design or artwork, and combinations thereof, and wherein the physical attributes include at least physical dimensions of the payment instrument selected from a group of a thickness of the payment instrument, a degree of embossing, a degree of concavity of text on the payment instrument, and combinations thereof;

determining, by the one or more computers, that the information and the physical attributes differ from third data associated with the payment instrument as stored by a payment server; and generating fourth data indicating a likelihood of a fraudulent event based at least in part on the information and the physical attributes differing from the third data.

15. The non-transitory computer-readable medium of claim 14, wherein the images are captured utilizing a digital scan of the payment instrument.

16. The non-transitory computer-readable medium of claim 14, wherein the payment instrument includes a near-field communication object, and the second data represents images of the near-field communication object.

17. The non-transitory computer-readable medium of claim 14, wherein the operations further include determining the risk metric by:

retrieving stored data known about the user account associated with the payment instrument; and outputting, with a machine-learning model and based on the stored data, the risk metric.

18. The non-transitory computer-readable medium of claim 14, wherein the operations further include causing output of a request to modify the information as determined from the three-dimensional model by user input.

19. The non-transitory computer-readable medium of claim 14, wherein determining that the information differs from the third data is based at least in part on analysis of the three-dimensional model utilizing optical character recognition processing and computer vision processing.

* * * * *